United States Patent [19]
Shiraiwa

[11] Patent Number: 5,208,702
[45] Date of Patent: May 4, 1993

[54] OBJECTIVE LENS SYSTEM FOR ENDOSCOPES

[75] Inventor: Masaru Shiraiwa, Tokyo, Japan

[73] Assignee: Olympus Optical Co., Ltd., Tokyo, Japan

[21] Appl. No.: 683,018

[22] Filed: Apr. 10, 1991

[30] Foreign Application Priority Data

Apr. 11, 1990 [JP] Japan .................................. 2-93937
Oct. 9, 1990 [JP] Japan ................................. 2-269483

[51] Int. Cl.$^5$ ............................................ G02B 13/22
[52] U.S. Cl. .................................... 359/663; 359/671; 359/747
[58] Field of Search ............... 350/432; 359/663, 671, 359/747

[56] References Cited

U.S. PATENT DOCUMENTS

| | | | |
|---|---|---|---|
| 4,598,980 | 7/1986 | Doi et al. | 350/445 |
| 4,662,725 | 5/1987 | Nishioka | 350/432 |
| 4,674,844 | 6/1987 | Nishioka et al. | 350/469 |
| 4,806,001 | 2/1989 | Okabe et al. | 350/432 |
| 5,050,974 | 9/1991 | Takasugi et al. | 359/663 |

FOREIGN PATENT DOCUMENTS 49-121547 11/1974 Japan .
57-173810 10/1982 Japan .
60-169818 9/1985 Japan .
61-162021 7/1986 Japan .

Primary Examiner—Bruce Y. Arnold
Assistant Examiner—Hung Xuan Dang
Attorney, Agent, or Firm—Cushman, Darby & Cushman

[57] ABSTRACT

An objective lens system for endoscopes comprising, in the order from the object side, a first lens component having a negative refractive power, a second lens component having a positive refractive power, an aperture stop arranged right after the second lens component, and a rear lens unit comprising a third lens component designed as a cemented doublet consisting of a lens element having a positive refractive power and a lens element having a negative refractive power. Said objective lens system for endoscopes has a wide field angle, a compact design, a small number of lens elements and favorably corrected aberrations.

13 Claims, 12 Drawing Sheets

OBJECTIVE LENS SYSTEM FOR ENDOSCOPES

BACKGROUND OF THE INVENTION a) Field of the Invention

The present invention relates to an objective lens system for endoscopes.

b) Description of the Prior Art

There is conventionally known the retrofocus type objective lens system for endoscopes illustrated in FIG. 1, as exemplified by the objective lens system disclosed by Japanese Patent Kokai Publication No. Sho 49-121547. This retrofocus type objective lens system comprises a first lens unit I arranged on the object side of an aperture stop S and a lens unit II arranged on the image side of the aperture stop S. This objective lens system is designed so as to have a wide field angle by strongly refracting the principal ray p by the lens unit I which is arranged before the aperture stop S and has a negative refractive power, and allow light bundle to be incident perpendicularly on an end surface of an image guide G by arranging the aperture stop at the front focal point of the lens unit II which has a positive refractive power so as to compose the telecentric optical system wherein the principal ray is parallel with the optical axis. Loss of light amount is reduced by allowing the light bundle perpendicularly on the end surface of the image guide as described above.

Further, there are widely used, in these days, video endoscopes which employ solid-state image pickup devices in place of the image guides.

Image pickup systems for video endoscopes are classified into the field sequential color type and the dot sequential color type. The dot sequential color type image pickup system includes color encoding filters (generally referred to as color mosaic filters) which are fine color filters integrated in mosaic patterns at locations corresponding to picture elements of a solid-state image pickup devide on the incidence side of the solid-state image pickup device so as to obtain color signals.

When the principal ray is incident obliquely on the imaging surface in a video endoscope incorporating the dot sequential color system, the ray which is to fall at a large angle of incidence on the solid-state image pickup device falls, after passing through the color filter, not on the picture element on which the ray should originally be incident but on the picture element adjacent thereto, thereby producing color ununiformity (color shading) on an image. It is impossible to prevent the production of the color shading, for example, in the optical system disclosed by Japanese Patent Kokai Publication No. Sho 62-173415 in which the principal ray is incident obliquely on the image pickup device as shown in FIG. 2.

For the reason described above, it is necessary to use telecentric objective lens systems also in video endoscopes.

However, it is difficult to correct coma in a telecentric objective lens system like the objective lens systems shown in FIG. 1, in which an aperture stop S is arranged right after a lens unit I having a negative refractive power. In this objective lens system, the coma produced by the lens unit I are connected by lens surfaces arranged on the image side of the aperture stop. Further, in the objective lens system shown in FIG. 1, the lens surfaces arranged close to the aperture stop, like the image side surface of the second lens component (the lens component arranged right after the aperture stop) have centers of curvature nearly aligned with the center of the aperture stop, whereby these surfaces produce little coma and cannot correct the asymmetry of the coma produced by the first lens component (the negative lens component) even when radii of curvature are shortened on these surfaces.

Since the coma is corrected insufficiently by the second lens component as described above, height of ray is enhanced by locating the third lens component far from the aperture stop and coma is corrected by shortening the radius of corvature on the cemented surface in the objective lens system shown in FIG. 1. When the power of the first lens component is strengthened for widening the field angle of the objective lens system shown in FIG. 1, remarkable coma is produced by the first lens component. When this coma is corrected, the second and later lens components produce remarkable spherical aberration and astigmatism. In order to correct these aberrations favorably, it is necessary to reserve wide airspaces between the lens components and weaken the powers of the individual lens components. The total length of the objective lens system will be prolonged and the outside diameters of the lens components will be enlarged accordingly.

Since the video endoscope comprises the solid-state image pickup device which has sensitivity not only to the visible light but also to the infrared light, it hinders colors from being reproduced correctly on images projected onto a monitor TV. For correct color reproduction on images projected onto the monitor TV, it is necessary to use a filter which cuts off the infrared light in the video endoscope.

Further, when medical treatments are carried out by using a laser light having a wavelength within the near infrared region or the far infrared region, the solid-state image pickup device is saturated by the laser light, thereby hindering clear observation of the locations to be treated. In order to solve this problem, a filter which cuts off the laser light to be used for medical treatment must be arranged in the optical system of the video endoscope.

When an attempt is made to reserve a space for arranging these filters before the aperture stop in the lens systems illustrated in FIG. 3, the distance as measured from the first lens component to the aperture stop is prolonged and the outside diameter of the first lens component is enlarged. When another attempt is made to shorten the outside diameter of the first lens component, the inclination angle of the offaxial principal ray to pass through the aperture stop (the angle T shown in FIG. 1) will be reduced. In case of the telecentric optical system in which the front focal point of the lens unit II arranged after the aperture stop is located at the position of the aperture stop, the reduction of the inclination angle T shown in FIG. 1 will prolong the distance as measured from the aperture stop to the lens unit II, thereby prolonging the total length of the optical system. Further in order to reserve the space for arranging the above-mentioned filters after the aperture stop, the lens unit II must have a longer focal length, thereby obliging to prolong the total length of the optical system. For this reason, the optical system shown in FIG. 1 is not suited for use in the video endoscope since it prolongs the total lengths of the video endoscopes. Furthermore, remarkable distortion is produced in the objective lens system for endoscopes which satisfies the telecentric condition.

Distortion is dependent on angle of incidence $\theta_1$ of the principal ray on the entrance pupil. Further, image height is a function of the angle of incidence $\theta_1$.

When distortion is represented by $D(\theta_1)$ and image height is designated by $H(\theta_1)$ distortion $D(\theta_1)$ (is defined by the following formula (i):

$$D(\theta_1) = 100 \times [\{H(\theta_1)/f \cdot \tan\theta_1\} - 1] \, (\%) \quad \text{(i)}$$

wherein the reference symbol f represents the focal length of the telecentric objective lens system.

Using $A(\theta_1)$ which is a function of $\theta_1$, image height $H(\theta_1)$ is generally expressed as follows:

$$H(\theta_1) = fA(\theta_1)$$

When this formula is used in the formula (i), we obtain:

$$D(\theta_1) = 100 \times [(A(\theta_1)/\tan\theta_1) - 1] \, (\%) \quad \text{(ii)}$$

As is understood from the formula (ii), the relationship between the distortion and the angle of incidence of the principal ray is determined by the function $A(\theta_1)$ only which defines the relationship between the image height and the angle of incidence of the principal ray. That is to say, the function $A(\theta_1)$ represents a characteristics of the distortion in the optical system.

Generally speaking, the function $A(\theta_1)$ is dependent solely on imaging relationship of pupil, and classified into dependency on the paraxial pupil magnification and imaging aberrations of pupil (offense against the sine condition determined by tracing rays from points on the pupils taken as object points and spherical aberration). When it is assumed that an objective lens system is free from aberrations of pupil, i.e., when the sine condition of pupil is satisfied at all image heights in an obJective lens system and spherical aberration is not produced neither at the entrance pupil nor the exit pupil, $A(\theta_1)$ is determined uniquely by using only the paraxial pupil magnification as a parameter. Speaking concretely, $A(\theta_1)$ is expressed as follows by using the paraxial pupil magnification which is represented by $\beta_g$:

$$A(\theta_1) = \sin\theta_1 / \sqrt{1 - (\sin^2\theta_1)/\beta_E^2} \quad \text{(iii)}$$

In order to maintain the telecentric condition, it is necessary to reserve a sufficiently large absolute value of the paraxial pupil magnification $|\beta_E|$ for an objective lens system for endoscopes.

When $|\beta_E|$ is sufficiently large, the formula (iii) allows $A(\theta_1)$ to be approximated to $\sin\theta_1$ and the distortion is expressed as follows:

$$D(\theta_1) \sim 100 \times [\cos\theta_1 - 1](\%) \quad \text{(iv)}$$

As is understood from this formula (iv), negative distortion increases as $\theta_1$ is enlarged In the objective lens system which satisfies the telecentric condition, the distortion is produced due to the paraxial relationship of pupil. In order to correct this destortion, it is necessary to produce offense against the sine condition in imaging of pupil. In an attempt to correct the distortion in an optical system for endoscopes, an increase of the offense against the sine condition in imaging of pupil will produce direct influences on the asymmetrical aberrations in imaging of an object, i.e., astigmatism and coma. An attempt to design an objective lens system compact and widen the field angle thereof also makes it difficult to correct aberrations, especially the offaxial aberrations. In designing an objective optical system for endoscopes, it is therefore important how to favorably correct the aberrations other than the distortion after the optical system has a wide field angle, sufficiently corrected distortion and a small outside diameter or a compact design. It is impossible to obtain a preferable objective lens system for endoscopes without satisfying all of these requirements at the same time.

As an conventional example of objective lens systems for endoscopes which have distortion and the other abennation corrected favorably by using aspherical surfaces, there is known the lens system disclosed by Japanese Patent Kokai Publication No. Sho 57-173810. However, this objective lens system has a narrow field angle of 56° and distortion which is not corrected completely.

Further, the optical system disclosed by Japanese Patent Kokai Publication No. Sho 60-169818, which is illustrated in FIG. 4, is a telecentric optical system composed of a front lens unit having a negative power and a rear lens unit having a positive power which are arranged on both sides of an aperture stop, and has distortion corrected by using at least one aspherical surface in the front lens unit. However, the optical systems preferred as the embodiments of the above-mentioned Japanese Patent Kokai Publication No. Sho 60-169818 are not compact and undesirably comprise very large numbers of lens elements.

Furthermore, the optical system disclosed by Japanese Patent Kokai Publication No. Sho 61-162021, shown in FIG. 5, is a telecentric optical system which uses at least one aspherical surface on each of the object side and the image side of an aperture stop, and has corrected distortion. However, this optical system is not compact, like the optical system proposed by Japanese Patent Kokai Publication No. Sho 60-169818, and not practical since the aspherical surfaces used therein have large departures from the reference spheres and can hardly be manufactured in practice.

SUMMARY OF THE INVENTION

A primary object of the present invention is to provide a compact objective lens system for endoscopes which is designed as a telecentric optical system and has a wide field angle.

Another object of the present invention is to provide an objective lens system for endoscopes which has favorably corrected coma.

A further object of the present invention is to provide an objective lens system for endoscopes which has favorably corrected distortion.

A still further object of the present invention is to provide an objective lens system for endoscopes using an aspherical lens element having a shape which can easily be manufactured in practice.

The objective lens system for endoscopes according to the present invention comprises, in the order from the object side, a front lens unit comprising a first lens component having a negative refractive power and a second lens component having a positive refractive power, an aperture stop, and a rear lens unit which is arranged after the aperture stop, comprises a cemented doublet consisting of a positive lens element and a negative lens element, and has a positive refractive power as a whole.

Description will be made on the relationship between distortion and the offense against the sine condition of pupil in case of an optical system which has an infinite paraxial pupil magnification $\beta_{ET}$ and no Spherical aberration at the entrance pupil nor the exit pupil.

In FIG. 6, image height $H(\theta_1)$ is expressed as $H(\theta_1)=fA(\theta_1)$ using $A(\theta_1)$ which is an optional function having a differential coefficient of 1 at $\theta_1=0°$. From this relationship and the definition of the offense against the sine condition at an infinite object distance $H(\theta_1)-f\sin\theta_1$, the offense against the sine condition of pupil which is determined by tracking the principal ray from the image surface toward the object surface is expressed as $f[A(\theta_1)\sin\theta]$.

Let us divide this offense against the sine condition of pupil by $f\sin\theta_1$ and normalize the quotient, and represent the obtained amount by $s(\theta_1)$. Then, this amount is expressed as follows:

$$S(\theta_1) = \{A(\theta_1)/\sin\theta_1\} - 1$$

Since $A(\theta_1)=\tan\theta_1$ is applicable to an optical system free from distortion, it is sufficient, for completely correcting distortion in a telecentric optical system which has an infinite value of $\beta_{ET}$, to produce the offense against the sine condition of pupil in such an amount that $S(\theta_1)$ has the value given below:

$$S(\theta_1) = \tan\theta_1/\sin\theta_1] - 1$$

When the value of $S(\theta_1)$ is known, in contrast, it is possible to calculate $A(\theta_1)$ and determine the distortion $D(\theta_1)$. That is to say, $D(\theta_1)$ can be expressed by the following formula (xiv):

$$D(\theta_1) = 100 \times [\{S(\theta_1)+1\}\cos\theta_1 - 1](\%) \quad \text{(xiv)}$$

By tracing the principal ray from the image surface toward the object surface as described above, it is possible to determine normalized values $S_1(\theta_1)$ and $S_2(\theta_1)$ Of the offense against the sine condition of the front lens unit and the rear lens unit respectively.

The above-mentioned $S(\theta_1)$, $S_1(\theta_1)$ and $S_2(\theta_1)$ are in the relationship defined below:

$$S(\theta_1)+1 = \{S_1(\theta_1)+1\}\{S_2(\theta_1)+1\} \quad \text{(xv)}$$

When $S(\theta_1)$ and $S_2(\theta_1)$ are known, the above-mentioned formula (xv) permits calculating a value of $S(\theta_1)$.

For an optical system which has spherical aberrations of the entrance pupil and the exit pupil, the influence due to the spherical aberration must be taken into consideration. The more or less variation of distortion caused dependently on location of object point is traced to the influence due to the above-mentioned spherical aberrations of the pupils and it is desirable to take the spherical aberrations of pupil into consideration also for $S_1(\theta_1)$ and $S_2(\theta_1)$.

In order to determine $S_1(\theta_1)$ while taking the spherical aberration of the entrance pupil into consideration, it is sufficient to trace rays from the aperture stop toward the front lens unit in the direction indicated by the arrow A in FIG. 6 taking the center of the aperture stop as an object point and the object surface as an imaginary aperture stop. In this case, $S_1(\theta_1)$ is defined by the following formula (xvi):

$$S_1(\theta_1) = \frac{\sin\theta_2/\sin\theta_1}{\bar{\beta}_1} \cdot \frac{\bar{l}_1}{l_1(\theta_1)} - 1 \quad \text{(xvi)}$$

wherein the reference symbol $\theta_2$ represents the angle which is formed between the principle ray and the optical axis at the location of the aperture stop and, when the aperture stop is arranged in a glass material, to be expressed in terms of an angle calculated on an assumption that the aperture stop is arranged in air, the reference symbol $\bar{\beta}_1$ designates the paraxial pupil magnification of the front lens unit determined in the direction from the aperture stop toward the object (in the direction indicated by the arrow A), the reference symbol $\bar{l}_1$ denotes the distance as measured from the object surface to the paraxial entrance pupil, and the reference symbol $l_1(\theta_1)$ represents the distance as measured from the object surface to the offaxial entrance pupil. $\bar{l}_1$ and $l_1(\theta_1)$ should be considered as positive when they are measured in the direction indicated by the arrow A taking the object surface as standard.

Similarly, $S_2(\theta_1)$ can be determined by tracing rays from the aperture stop toward the rear lens unit in the direction indicated by the arrow B in FIG. 8 taking the center of the aperture stop as an object point and the image surface as an imaginary aperture stop. Since the rays are traced in this case in the direction reverse to that for determining $S_1(\theta_1)$ of the front lens unit, $S_2(\theta_1)$ is defined by the following formula (xvii):

$$S_2(\theta_1) = \frac{\bar{\beta}_2}{\sin\theta_2/\sin\theta_3} \cdot \frac{l_2(\theta_1)}{\bar{l}_1} - 1 \quad \text{(xvii)}$$

wherein the reference symbol $\theta_3$ represents the angle which is formed between the principal ray emerging from the image surface and the optical axis, and is expressed in terms of angle measured in air, the reference symbol $\bar{\beta}_2$ designates the paraxial pupil magnification determined in the direction from the aperture stop toward the image surface (in the direction indicated by the arrow B), the reference symbol $\bar{l}_2$ denotes the distance as measured from the image surface to the paraxial exit pupil, and the reference symbol $l_2(\theta_1)$ represents the distance as measured from the image surface to the offaxial exit pupil. As for signs of $\bar{l}_2$ and $l_2(\theta_1)$, they are to be considered as positive when they are measured in the direction indicated by the arrow B taking the image surface as standard. Further, $\theta_1$, $\theta_2$, and $\theta_3$ are to be considered as negative when the principal ray incident from the object side travels so as to be nearer the optical axis before the aperture stop or when the principal ray travels farther from the optical axis after the aperture stop.

When the offense against the sine condition is produced so as to correct the negative distortion in both the front lens unit and the rear lens unit, both $S_1(\theta_1)$ and $S_2(\theta_1)$ have positive values, and $S(\theta_1)$ determined by the formula (xiv) also has a positive value.

Even when the sine condition of pupil is nearly satisfied as expressed by the formulae (xvi) and (xvii), it is possible to enlarge value of $S_1(\theta_1)$ by varying amount of the spherical aberration of the pupil, i.e., $\bar{l}_1/l_1(\theta_1)$ or $l_2(\theta_1)/\bar{l}_2$ in the formula (xvi) or (xvii). On an assumption that the rear lens unit has a certain definite composition, tracing rays through the front lens unit from the aperture stop toward the object side will clarify that angle of incidence of ray is small on the first lens component in the objective lens system according to the present invention wherein the second positive lens component is arranged between the first lens component and the aperture stop. In order to obtain the desired value of $\theta_1$, it is necessary to strengthen the power of the first lens component. When the power of the first lens component is strengthened, it produces the spherical aberration of pupil in a larger amount, thereby making it possible to enlarge the value of $\overline{l_1}/l_1(\theta_1)$ in the formula (xvi). When the value of $\overline{l_1}/l_1(\theta_1)$ has a larger value, $S(\theta_1)$ also has a large value, thereby making it possible to reduce the distortion.

In order to further enlarge the value of $\overline{l_1}/l_1(\theta_1)$ in the objective lens system according to the present invention, it is desirable to design the first lens component so as to satisfy the following condition (1):

(1) $|f_1/f| < 5$ wherein the reference symbol $f_1$ represents the focal length of the first lens component.

If the upper limit of the condition (1) is exceeded, it will be impossible to enlarge the value of $\overline{l_1}/l_1(\theta_1)$ in the formula (xvi), whereby the distortion will be corrected at a low degree.

Further, $\overline{l_1}/l_1(\theta_1)$ can have a larger value at smaller angle of incidence on the first lens component so far as the value of $\theta_1$ remains unchanged. In order to reduce the angle of incidence on the first lens component, it is desirable to design the second lens component so as to satisfy the following condition (2):

(2) $|f_2/f| < 10$ wherein the reference symbol $f_2$ represents the focal length of the second lens component.

In order to allow the second lens component having the positive refractive power to produce spherical aberration in the direction reverse to that of the spherical aberration of pupil produced by the first lens component, it is desirable to design the second lens component so as to have a shape which produces little spherical aberration when the pupil is taken as an object point. As is judged from the relationship between the amount of the spherical aberration to be produced and bending of lens, it is possible to minimize the spherical aberration by selecting a shape which is similar to that of a planoconvex lens component having a convex surface of the image side. It is therefore desirable to design the surfaces of the second lens component so as to satisfy the following condition (3):

(3) $|r_b/r_a| < 0.7$ wherein the reference symbols $r_a$ and $r_b$ represent the radii of curvature on the surface located on the side opposite to the aperture stop and the surface located on the side of the aperture stop respectively.

Since the objective lens system for endoscopes according to the present invention comprises the second lens component which has the positive refractive power and arranged between the first lens component having the negative refractive power and the aperture stop, and has the distortion which is corrected to a certain degree by desingning the first lens unit and the second lens unit so as to satisfy the conditions (1), (2) and (3), the objective lens system requires a small number of aspherical surfaces which have small departures from the reference spheres thereof and can be manufactured easily in practice.

In the objective lens system according to the present invention, the aberrations other than the distortion can be corrected as described below:

By arranging the second lens component having the positive refractive power between the first lens component having the negative refractive power and the aperture stop, it is possible to allow the rear surface of the second lens component to produce positive coma in the direction reverse to that of the negative coma produced by the first lens component.

As for the spherical aberration, the strong positive spherical aberration produced by the first lens component can be corrected by producing negative spherical aberration with the positive function of the second lens component. For this purpose, it is necessary that the second lens component produces a certain amount of spherical aberration and is designed so as to satisfy the following condition (4) which is obtained by defining a lower limit for the above-mentioned condition (3) as shown below:

(4) $0.01 < |r_b/r_a| < 0.7$

If the lower limit of the condition (4) is exceeded, it will be impossible to sufficiently correct the spherical aberration produced by the first lens component. When the rear lens unit of the objective lens system for endoscopes according to the present invention is composed of a third lens component which is designed as the positive cemented doublet consisting of the positive lens element and the negative lens element, and a fourth lens component having a positive refractive power, the negative coma produced by the fourth lens component and the negative coma slightly remaining in the front lens unit are corrected by producing positive coma with the cemented surface of the third lens component. Since the coma can be corrected by both the front lens unit and the rear lens unit which are arranged before and after the aperture stop, it is possible to lessen curvature and amount of coma in the objective lens system for endoscopes according to the present invention.

In case of the conventional objective lens system for endoscopes wherein the negative lens component is arranged right after the aperture stop, the lateral chromatic aberration produced by the negative lens component cannot be corrrected sufficiently since lateral chromatic aberration is corrected only by the cemented doublet arranged in the rear lens unit.

In the objective lens system according to the present invention, aberrations can be corrected sufficiently favorably with a small number of lens elements since the aberrations are corrected in the front lens unit arranged before the aperture stop.

In order to widen the field angle of the objective lens system and lower the height of ray on the first lens component for reducing the diameter thereof, it is necessary to strengthen the refractive power of the first lens component. In the objective lens system according to the present invention in which the coma and chromatic aberration produced by the first lens component can be cancelled by the second lens component, the aberrations can be corrected sufficiently even when the refractive power of the first lens component is strengthened.

When it is assumed that the distance as measured from the second lens component $L_2$ to the aperture stop is zero in the objective lens system according to the present invention illustrated in FIG. 7 wherein the second lens component $L_2$ is arranged right after the apereture stop, the ray to attain to the maximum image height intersects with the optical axis at the location of the principal point of the second lens component. Therefore, the angle $\theta'$ shown in FIG. 7 remains unchanged even when the power of the second lens component is varied. Accordingly, the field angle of this objective lens system has no relation to the power of the second lens component.

When the focal length of the objective lens system having the composition illustrated in FIG. 7 is represented by f, the focal length of the first lens component $L_1$ is designated by $f_1$, and the lateral magnification of the total system composed of the second lens component $L_2$ and the third lens component $L_3$ is denoted by $\beta_{23}$, the focal length f is expressed by the following formula (v):

$$f = f_1 \cdot \beta_{23}$$

Let us examine here only the total system composed of the second lens component $L_2$ and the third lens component $L_3$. Front principal point $H_{23}$, rear principal point $H_{23}'$ and focal length $f_{23}$ of this lens system are expressed by the following formulae:

$$H_{23} = f_{23} \cdot D_2 / f_3$$

$$H_{23}' = -f_{23} \cdot D_2 / f_3$$

$$1/f_{23} = (1/f_2) + (1/f_3) - (D_2/f_2 \cdot f_3)$$

wherein the reference symbols $f_2$ and $f_3$ represent the focal lengths of the second lens component $L_2$ and the third lens component $L_3$ respectively.

Since this lens system is a telecentric system, $D_2$ is equal to $f_2$, and $H_{23}$, $H_{23}'$ and $f_{23}$ are expressed by the following formulae (vi), (vii) and (viii) respectively.

$$H_{23} = f_3 \quad \text{(vi)}$$

$$H_{23}' = f_3^2 / f_2 \quad \text{(vii)}$$

$$f_{23} = f_3 \quad \text{(viii)}$$

Hence, $\beta_{23}$ is given by the following formula (ix):

$$\beta_{23} = f_3 / (|f_1| + D_1) \quad \text{(ix)}$$

As is undeerstood from the formulae (v) and (ix), f has no relation to the power of the second lens component $L_2$.

As is clarified by the foregoing description, the field angle $\theta$ and the focal length f of the objective lens system illustrated in FIG. 7 are kept constant regardless of the power of the second lens component $L_2$ when powers, etc. of the first lens component $L_1$ and the lens component $L_3$ are kept fixed.

Further, back focal length $S_k$ of the objective lens system illustrated in FIG. 7 is given by the following formula (x):

$$S_k = (1 + \beta_{23}) f_3 - f_3^2 / f_2 \quad \text{(x)}$$

Furthermore, total length l of the objective lens system is expressed by the following formula (xi):

$$l = D_1 + f_3 + (1 + \beta_{23}) f_3 - f_3^2 / f_2 \quad \text{(xi)}$$

When the conventional lens system shown in FIG. 1 is assumed to be as a lens system composed only of thin lens elements, it is equal to the objective lens system illustrated in FIG. 7 which is supposed to comprise the second lens component $L_2$ having the focal length $f = (\infty)$. On this assumption, comparison between the total length of the conventional lens system and that of the objective lens system according to the present invention indicates that the objective lens system according to the present invention which comprises the second lens component $L_2$ arranged in the vicinity of the aperture stop S has a total length which is $f_3^2/f_2$ shorter than that of the conventional lens system so far as $f_1$ and $f_3$ are selected at definite lengths, and both the lens systems have equal f and $\theta$.

Even in a case where it is necessary to arrange filters in an optical system, like a video endoscope, the objective lens system according to the present invention which is to comprise filters at the location indicated by the reference symbol $D_2$ in FIG. 7 can maintain the short total length, even when the space $D_2$ ($=f_3$) is widened, by shortening the focal length $f_2$ of the second lens component $L_2$.

In order to shorten the total length of the objective lens system according to the present invention having the above-described composition and correct aberrations favorably therein, it is desirable to design the first and second lens components $L_1$ and $L_2$ so as to satisfy the following conditions (5) and (6):

(5) $0.5f < |f_1| + |f_2| < 5f$ (6) $0.1 < |f_1|/|f_2| < 1.5$

In the lens system composed of the thin lens elements shown in FIG. 7, distance $D_1$ as measured from the first surface to the aperture stop S is expressed by the following formula (xii):

$$D_1 = |f_1| - D_3/(D_3/|f_2| - 1) \quad \text{(xii)}$$

wherein the reference symbol $D_3$ represents the distance as measured from the image point of the total system composed of the first lens component $L_1$ and the second lens component $L_2$ to the second lens component $L_2$.

$D_3$ can be kept constant when the rear lens unit has a certain definite power. In this case, it is understood from the formula (xii) that the distance $D_1$ is shorter as both $|f_1|$ and $|f_2|$ are shorter. Further, total length of the rear lens unit can be shortened by shortening $f_2$ as is judged from the formula (xi).

Let us consider $|f_1| + |f_2|$ as a parameter. If this parameter exceeds the upper limit of the condition (5), the distance as measured from the aperture stop to the first surface will undesirably be prolonged. If the lower limit of the condition (5) is exceeded, in contrast, the powers of the first lens component $L_1$ and the second lens component $L_2$ will be remarkably strengthened, thereby making it possible to shorten the total length of the objective lens system, but allowing the first lens component $L_1$ and the second lens component $L_2$ to produce aberrations in too large amounts or making it impossible to reduce the aberrations to be produced in the front lens unit.

When $|f_1|+|f_2|$ satisfies the condition (5) but the second lens component $L_2$ has a power too strong relative to that of the first lens component $L_1$, the negative spherical aberration produced by the second lens component $L_2$ is far stronger than the positive spherical aberration produced by the first lens component $L_1$ and cannot be corrected by the rear lens unit. When the power of the first lens component $L_1$ is stronger than that of the second lens component $L_2$, in contrast, the negative coma produced by the first lens component $L_1$ cannot be corrected sufficiently by the second lens component $L_2$.

For this reason, it is necessary for correcting aberrations favorably in the objective lens system according to the present invention to limit the ratio between the powers of the first lens component $L_1$ and the second lens component $L_2$ within a certain range. The condition (6) defines this range. If the lower limit of the condition (6) is exceeded, the spherical aberration will be aggravated and cannot be corrected. If the upper limit of the condition (6) is exceeded, coma will be aggravated to an incorrigible degree.

In order to shorten the total length of the objective lens system according to the present invention and favorably correct aberrations therein, it is desirable that focal length $f_R$ of the rear lens unit (the focal length of the total lens system $L_3$ composed of the third lens component and the fourth lens component) satisfies the following condition (7):

(7) $1.5f < f_R < 6f$

If $f_R$ exceeds the lower limit of the condition (7), the distance as measured from the aperture stop to the principal point of the rear lens unit is shortened, thereby making it possible to shorten the total length of the objective lens system but making the lens system undesirable as an objective lens system for video endoscopes which are to comprise infrared cut filter, YAG laser light cut filter, quartz filter and so on. In addition, the offaxial principal ray passing through the aperture stop will have a large inclination angle ($\theta'$ shown in FIG. 7) and the outside diameter of the front lens unit will be enlarged. Since the second lens component $L_2$ is located a little before the aperture stop in this lens system, the enlargement of the outside diameter of the first lens component $L_1$ can be prevented by remarkably strengthening the power of the second lens component $L_2$. When the power of the second lens component is strengthened, however, spherical aberration is produced remarkably and can hardly be corrected.

In order to shorten the total length of the objective lens system while reserving the space for arranging the filters after the aperture stop, it is sufficient to shorten the focal length $f_R$ of the rear lens unit while keeping the airspace between the aperture stop and the third lens component $L_3$ at a width sufficient for arranging the filters. In the objective lens system preferred as Embodiment 1 to be described later, for example, wherein a telecentric system is composed of the cemented doublet consisting of the third lens component and the fourth lens component plus a fifth lens component used as a field lens, it is possible to shorten the focal length $f_R$ of the rear lens unit while bringing the front principal point of the rear lens unit toward the aperture stop by remarkably strengthening the power of said cemented doublet and weaking the power of the field lens. If the focal length $f_R$ of the rear lens unit exceeds the lower limit of the condition (7), however, the power of the cemented doublet will be too strong, thereby making it difficult to correct the remarkable coma and astigmatism produced by this cemented doublet. Further, the outside diameter of the cemented doublet will undesirably be enlarged.

If $f_R$ exceeds the upper limit of the condition (7), the distance as measured from the aperture stop to the image surface will be prolonged, thereby undesirably prolonging the total length of the objective lens system. If an attempt is made to shorten the total length of the objective lens system while allowing $f_R$ to exceed the upper limit of the condition (7), the powers of the lens components arranged before the aperture stop will be strengthened, thereby making it difficult to correct spherical aberration, astigmatism and coma.

In case of an objective lens system for video endoscopes which use infrared light cut filters, YAG laser light cut filters and so on, it is desirable that the filters are arranged right before the aperture stop and that the focal length $f_R$ of the rear lens unit satisfies the following condition (8):

(8) $f_R/I > 1.2$ wherein the reference symbol I represents the maximum image height.

In an optical system wherein the principal ray is incident perpendicularly on the image surface, the angle $\theta'$ formed between the offaxial principal ray passing through the aperture stop and the optical axis is expressed by the following formula:

$$\tan\theta' = I/f_3$$

When rays are incident at large angles on, the interfernce type infrared light cut filters exhibit high transmittance for the rays within the infrared region and cannot cut off these rays.

The absorption type filters also produce, at large angles of incidence of rays, differences in optical path lengths dependently on differences of image height, thereby constituting a cause for color ununiformity on the image surface.

For the reasons described above, it is necessary to reduce angles of incidence of rays on both the interference type and absorption type filters. Speaking concretely, the angle $\theta'$ need be approximately 40° or narrower for both the types of filters. Therefore, it is desirable that $I/f_3$ satisfies the condition (8) so as to prevent the color ununiformity.

In a case where the solid-state image pickup device is used in a video endoscope, the light receiving surface of the solid-state image pickup device has reflectance as high as several to scores of percents, and the rays reflected by the light receiving surface are reflected again by the field lens and fall again on the image pickup surface, thereby producing flare. In order to prevent the flare from being produced, it is desirable to design the field lens so as to satisfy the following condition (9):

(9) $1.1 \times n.D < r_F < 1.9 \times n.D$ or $r_F < 0.9 \times n.D$ and $r_F > 2.1 \times n.D$ wherein the reference symbol $r_F$ represents the radius of curvature on the surface of the field lens which has a center of curvature on the side of the solid-state image pickup device shown in FIG. 8 (the surface M), the reference symbol n designates the refractive index of the medium adjacent to the surface M on the side of the solid-state image pickup device and the reference symbol D denotes the optical path length as measured from the surface M to the light receiving surface.

On assumptions that the surface M shown in FIG. is a reflecting surface, that the object point for the surface M is the light receiving surface and that the space between the surface M and the object point is filled with a medium having a refractive index of n, an image is formed as a ghost at the location of the object point when the distance n·D between the surface M and the object point is nearly equal to the radius of curvature on the surface M (n·D=$r_F$). In Order to weaken intensity of the ghost by displacing the location of the image, it is desirable that $r_F$ is smaller than 0.9 n·D or $r_F$ is larger than 1.1 n·D.

Further when the surface M shown in FIG. 8 is considered as a reflecting surface, the forcal length thereof is expressed as $r_F/2$. In the telecentric optical system, the principal ray is incident perpendicularly on the image surface, or the light receiving surface of a solid-state image pickup device. Accordingly, the principal rays coming from all heigths on an object are condensed onto the center of the light receiving surface by the reflection on the surface M, thereby producing flare. In order to prevent the flare, it is desirable that $r_F$ is smaller than 1.9×n·D or larger than 2.1×n·D.

When aspherical surfaces are to be adopted in this optical system for correcting distortion, it can be corrected more effectively or with a smaller number of aspherical surfaces by arranging these surfaces at a location where off-axial rays are higher. Therefore, it is desirable that the surfaces to be designed as the aspherical surfaces satisfy the following condition (10):

(10) $1.5 > |h_A/I| > 0.4$ wherein the reference symbol $h_A$ represents the height of ray on the surface of interest and the reference symbol I designates the maximum height of ray.

If the lower limit of the condition (10) is exceeded, it will be obliged to increase departures from the reference spheres of the aspherical surfaces, thereby making it rather difficult to manufacture the aspherical surfaces in practice. If the upper limit of the condition (10) is exceeded, in contrast, the aspherical surfaces will undesirably have large diameters.

The shapes of the aspherical surfaces to be used for correcting distortion are described in Japanese Patent Kokai Publication No. Sho 60-169818 and Japanese Patent Kokai Publication No. Sho 61-162021.

Speaking concretely, when an aspherical surface is to be arranged in a lens unit located before the aperture stop, the aspherical surface should have a shape which strengthens positive refractive power as the surface portions are farther from the optical axis or weakens negative refractive power as the surface portions are farther from the optical axis. When an aspherical surface is to be used as the first surface of the first lens component arranged in the front lens unit of the objective lens system according to the present invention, for example, it should be designed as a surface which has higher curvature on the portions thereof farther from the optical axis. When an aspherical surface is to be arranged in the lens unit located after the aperture stop, in contrast, it should be designed as a surface which weakens positive refractive power or strengthens negative refractive power as the surface portions are farther from the optical axis. When an aspherical surface is to be used as the final surface of the fourth lens component arranged in the rear lens unit of the objective lens system according to the present invention, for example, the aspherical surface should have a shape having curvature lowered as the surface portions are farther from the optical axis. It is possible to correct distortion sufficiently with a small number of aspherical surfaces having the shapes described above.

As is understood from the foregoing description, the objective lens system for endoscopes according to the present invention has a simple composition consisting of a small number of lens elements as described above, and is capable of correcting distortion and the other aberrations by using aspherical surfaces having small departures from the reference spheres thereof.

DETAILED DESCRIPTION OF THE PREFERRED EMBODIMENTS

Figure 1:
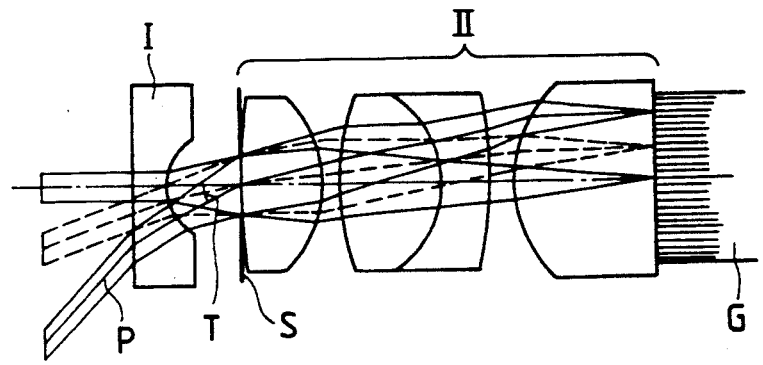
FIG. 1 through FIG. 4 show sectional views illustrating compositions of the conventional objective lens systems for endescopes.
Figure 2:
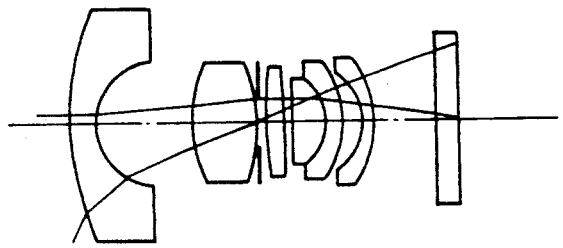
Figure 3:
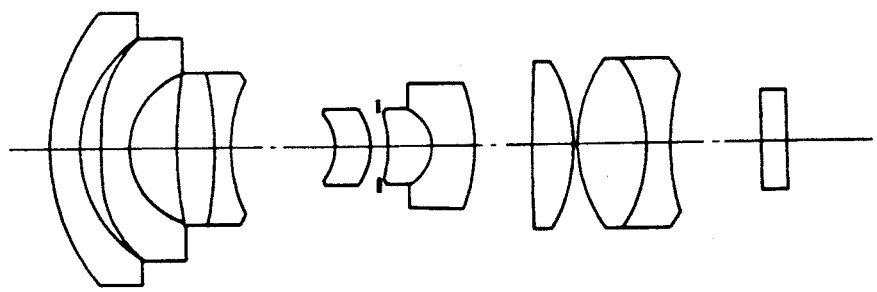
Figure 4:
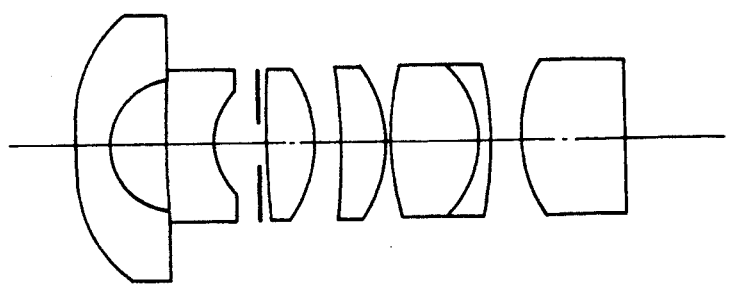

Now, the present invention will be described more detailedly below with reference to the preferred embodiments illustrated in the accompanying drawings and given in the form of the following numerical data:

Embodiment 1 f = 1.000, IH = 1.3137, 2ω = 120°

| | | | |
|---|---|---|---|
| $r_1$ = 26.9528 | $d_1$ = 0.3583 | $n_1$ = 1.51633 | $v_1$ = 64.15 |
| (aspherical surface) | | | |
| $r_2$ = 0.8818 | $d_2$ = 0.9849 | | |
| $r_3$ = −20.9482 | $d_3$ = 1.1354 | $n_2$ = 1.84666 | $v_2$ = 23.78 |
| $r_4$ = −2.2149 | $d_4$ = 0.0671 | | |
| $r_5$ = ∞ (stop) | $d_5$ = 1.4493 | | |
| $r_6$ = 3.9822 | $d_6$ = 0.2158 | $n_3$ = 1.84666 | $v_3$ = 23.78 |
| $r_7$ = 2.0462 | $d_7$ = 1.1098 | $n_4$ = 1.58913 | $v_4$ = 60.97 |

-continued

| | | | |
|---|---|---|---|
| $r_8 = -26.5803$ | $d_8 = 0.1013$ | | |
| (aspherical surface) | | | |
| $r_9 = 4.3309$ | $d_9 = 0.6529$ | $n_5 = 1.51633$ | $v_5 = 64.15$ |
| $r_{10} = \infty$ | $d_{10} = 1.1943$ | $n_6 = 1.54814$ | $v_6 = 45.78$ |
| $r_{11} = \infty$ | $d_{11} = 0.3185$ | $n_7 = 1.52287$ | $v_7 = 59.89$ |
| $r_{12} = \infty$ | | | |

Aspherical surface coefficients
(1st surface)
$P = 1.0000, B = 0.26364 \times 10^{-1}$
$E = 0.22972 \times 10^{-1}, F = -0.24589 \times 10^{-2}$
$G = -0.15767 \times 10^{-3}$
(8th surface)
$P = 1.0000, B = -0.31167$
$E = 0.31984 \times 10^{-1}, F = 0.36913 \times 10^{-2}$
$G = -0.67621 \times 10^{-3}$
$|f_1/f| = 1.877, |f_2/f| = 2.847$
$|r_b/r_a| = 0.1057, (|f_1| + |f_2|)/f = 4.724, |f_1|/|f_2| = 0.6593$
$f_R/f = 1.823, f_R/I = 1.388, r_F/(n \cdot D) = 2.024,$
$|h_A/I| = 0.978$ (1st serface)
$|h_A/I| = 0.898$ (8st serface)

Embodiment 2
$f = 1.000, IH = 1.4706, 2\omega = 120°$

| | | | |
|---|---|---|---|
| $r_1 = 90.9302$ | $d_1 = 0.4011$ | $n_1 = 1.51633$ | $v_1 = 64.15$ |
| (aspherical surface) | | | |
| $r_2 = 0.8938$ | $d_2 = 1.1054$ | | |
| $r_3 = -9.7941$ | $d_3 = 1.2474$ | $n_2 = 1.84666$ | $v_2 = 23.78$ |
| $r_4 = -2.2534$ | $d_4 = 0.0747$ | | |
| $r_5 = \infty$ (stop) | $d_5 = 1.6148$ | | |
| $r_6 = 3.8553$ | $d_6 = 0.2169$ | $n_3 = 1.84666$ | $v_3 = 23.78$ |
| $r_7 = 2.1578$ | $d_7 = 1.2396$ | $n_4 = 1.56873$ | $v_4 = 63.16$ |
| $r_8 = -42.2973$ | $d_8 = 0.2023$ | | |
| (aspherical surface) | | | |
| $r_9 = 5.2064$ | $d_9 = 0.7308$ | $n_5 = 1.51633$ | $v_5 = 64.15$ |
| $r_{10} = \infty$ | $d_{10} = 1.3369$ | $n_6 = 1.54814$ | $v_6 = 45.78$ |
| $r_{11} = \infty$ | $d_{11} = 0.3565$ | $n_7 = 1.52287$ | $v_7 = 59.89$ |
| $r_{12} = \infty$ | | | |

Aspherical surface coefficients
(1st surface)
$P = 1.0000, B = -0.12677 \times 10^{-2}$
$E = 0.13626 \times 10^{-1}, F = -0.10468 \times 10^{-2}$
$G = 0.82808 \times 10^{-6}$
(8th surface)
$P = 1.0000, B = -0.28698$
$E = 0.22277 \times 10^{-1}, F = 0.20339 \times 10^{-2}$
$G = -0.30968 \times 10^{-3}$
$|f_1/f| = 1.746, |f_2/f| = 3.213$
$|r_b/r_a| = 0.2301, (|f_1| + |f_2|)/f = 4.593, |f_1|/|f_2| = 0.6133,$
$f_R/f = 2.078, f_R/I = 1.413, r_F/(n \cdot D) = 2.1734$
$|h_A/I| = 1.11$ (1st surface)
$|h_A/I| = 0.896$ (8th surface)

Embodiment 3
$f = 1.000, IH = 1.0503, 2\omega = 120°$

| | | | |
|---|---|---|---|
| $r_1 = \infty$ | $d_1 = 0.2864$ | $n_1 = 1.51633$ | $v_1 = 61.15$ |
| $r_2 = 0.7558$ | $d_2 = 0.7762$ | | |
| $r_3 = 15.9736$ | $d_3 = 0.8808$ | $n_2 = 1.84666$ | $v_2 = 23.78$ |
| $r_4 = -1.7740$ | $d_4 = 0.0556$ | | |
| $r_5 = \infty$ (stop) | $d_5 = 1.2065$ | | |
| $r_6 = 4.2603$ | $d_6 = 0.1934$ | $n_3 = 1.84666$ | $v_3 = 23.78$ |
| $r_7 = 2.0223$ | $d_7 = 0.8391$ | $n_4 = 1.60311$ | $v_4 = 60.70$ |
| $r_8 = -21.2507$ | $d_8 = 0.2233$ | | |
| (aspherical surface) | | | |
| $r_9 = 2.7621$ | $d_9 = 0.5220$ | $n_5 = 1.51633$ | $v_5 = 64.15$ |
| $r_{10} = \infty$ | $d_{10} = 0.9548$ | $n_6 = 1.54814$ | $v_6 = 45.78$ |
| $r_{11} = \infty$ | $d_{11} = 0.2546$ | $n_7 = 1.52287$ | $v_7 = 59.89$ |
| $r_{12} = \infty$ | | | |

Aspherical surface coefficients
$P = 1.0000, B = -0.25965$
$E = 0.38331 \times 10^{-1}, F = 0.13060 \times 10^{-1}$
$G = -0.39414 \times 10^{-2}$
$|f_1/f| = 1.464, |f_2/f| = 1.93$
$|r_b/r_a| = 0.1111, (|f_1| + |f_2|)/f = 3.394,$
$|f_1|/|f_2| = 0.7585, f_R/f = 1.788, f_R/I = 1.702,$
$r_F/(n \cdot D) = 1.6146, |hA/I| = 0.852$ Embodiment 4
$f = 1.000, IH = 0.9994, 2\omega = 120°$

| | | | |
|---|---|---|---|
| $r_1 = 54.0021$ | $d_1 = 0.2726$ | $n_1 = 1.88300$ | $v_1 = 40.78$ |
| (aspherical surface) | | | |
| $r_2 = 0.6353$ | $d_2 = 0.6849$ | | |
| $r_3 = 2.7716$ | $d_3 = 0.7783$ | $n_2 = 1.78590$ | $v_2 = 44.18$ |
| $r_4 = -1.6567$ | $d_4 = 0.0841$ | | |
| $r_5 = \infty$ (stop) | $d_5 = 1.1435$ | | |
| $r_6 = 5.9253$ | $d_6 = 0.7891$ | $n_3 = 1.60311$ | $v_3 = 60.70$ |
| $r_7 = -0.8411$ | $d_7 = 0.1979$ | $n_4 = 1.84666$ | $v_4 = 23.78$ |
| $r_8 = -1.7267$ | $d_8 = 0.9616$ | | |
| $r_9 = 3.6657$ | $d_9 = 0.4967$ | $n_5 = 1.72916$ | $v_5 = 54.68$ |
| $r_{10} = \infty$ | $d_{10} = 0.9085$ | $n_6 = 1.54814$ | $v_6 = 45.78$ |
| $r_{11} = \infty$ | $d_{11} = 0.2423$ | $n_7 = 1.52287$ | $v_7 = 59.89$ |
| $r_{12} = \infty$ | | | |

Aspherical surface coefficients
$P = 1.0000, B = 0.69964 \times 10^{-2}$
$E = 0.4505 \times 10^{-1}, F = 0.14542 \times 10^{-1}$
$G = -0.22317 \times 10^{-1}$
$|f_1/f| = 0.738, |f_2/f| = 1.43$
$|r_b/r_a| = 0.5977, (|f_1| + |f_2|)/f = 2.168, |f_1|/|f_2| = 0.5161,$
$f_Rf = 2.291, f_R/I = 2.292, r_F/(n \cdot D) = 2.047, |h_A/I| = 0.628$ Embodiment 5
$f = 1, NA = 0.0162, IH = 0.6965$
$2\omega = 80°$

| | | | |
|---|---|---|---|
| $r_1 = \infty$ | $d_1 = 0.1900$ | $n_1 = 1.88300$ | $v_1 = 40.78$ |
| $r_2 = 0.4434$ | $d_2 = 0.3463$ | | |
| $r_3 = 1.9976$ | $d_3 = 0.5313$ | $n_2 = 1.81600$ | $v_2 = 46.62$ |
| $r_4 = -0.8853$ | $d_4 = 0.0507$ | | |
| $r_5 = \infty$ (stop) | $d_5 = 0.3322$ | | |
| $r_6 = \infty$ | $d_6 = 0.6332$ | $n_3 = 1.52000$ | $v_3 = 74.00$ |
| $r_7 = \infty$ | $d_7 = 0.1544$ | | |
| $r_8 = 4.1812$ | $d_8 = 0.5566$ | $n_4 = 1.65844$ | $v_4 = 50.86$ |
| $r_9 = -0.5992$ | $d_9 = 0.1562$ | $n_5 = 1.84666$ | $v_6 = 23.78$ |
| $r_{10} = -3.0162$ | $d_{10} = 0.7576$ | | |
| $r_{11} = 1.9880$ | $d_{11} = 0.3377$ | $n_6 = 1.72916$ | $v_6 = 54.68$ |
| $r_{12} = \infty$ | $d_{12} = 0.6332$ | $n_7 = 1.54814$ | $v_7 = 45.78$ |
| $r_{13} = \infty$ | $d_{13} = 0.1688$ | $n_8 = 1.52287$ | $v_8 = 59.89$ |
| $r_{14} = \infty$ | | | |

$|f_1/f| = 0.502, |f_2/f| = 0.819, |r_b/r_a| = 0.4432,$
$(|f_1| + |f_2|)/f = 1.321, |f_1|/|f_2| = 0.6129$
$f_R/f = 2.247, f_R/I = 3.226, r_F/(n \cdot D) = 1.609$ Embodiment 6
$f = 1, NA = 0.0107, IH = 1.0423$
$2\omega = 140°$

| | | | |
|---|---|---|---|
| $r_1 = \infty$ | $d_1 = 0.2843$ | $n_1 = 1.88300$ | $v_1 = 40.78$ |
| $r_2 = 0.6347$ | $d_2 = 0.7392$ | | |
| $r_3 = 7.1449$ | $d_3 = 0.7168$ | $n_2 = 1.88300$ | $v_2 = 40.78$ |
| $r_4 = -1.3822$ | $d_4 = 0.0758$ | | |
| $r_5 = \infty$ (stop) | $d_5 = 0.4972$ | | |
| $r_6 = \infty$ | $d_6 = 0.9476$ | $n_3 = 1.52000$ | $v_3 = 74.00$ |
| $r_7 = \infty$ | $d_7 = 0.1315$ | | |
| $r_8 = 7.0140$ | $d_8 = 0.8552$ | $n_4 = 1.60729$ | $v_4 = 59.38$ |
| $r_9 = -0.9595$ | $d_9 = 0.2211$ | $n_5 = 1.84666$ | $v_5 = 23.78$ |
| $r_{10} = -2.2867$ | $d_{10} = 0.7169$ | | |
| $r_{11} = 3.2304$ | $d_{11} = 0.5054$ | $n_6 = 1.72916$ | $v_6 = 54.68$ |
| $r_{12} = \infty$ | $d_{12} = 0.9476$ | $n_7 = 1.54814$ | $v_7 = 45.78$ |
| $r_{13} = \infty$ | $d_{13} = 0.2527$ | $n_8 = 1.52287$ | $v_8 = 59.89$ |
| $r_{14} = \infty$ | | | |

$|f_1/f| = 0.719, |f_2/f| = 1.366, |r_b/r_a| = 0.1934$
$(|f_1| + |f_2|)/f = 2.085, |f_1|/|f_2| = 0.545$
$f_R/f = 2.537, f_R/I = 2.434, r_F/(n \cdot D) = 1.7455$ Embodiment 7
$f = 1, NA = 0.0118, IH = 0.9116$
$2\omega = 120°$

| | | | |
|---|---|---|---|
| $r_1 = \infty$ | $d_1 = 0.2486$ | $n_1 = 1.88300$ | $v_1 = 40.78$ |
| $r_2 = 0.5840$ | $d_2 = 0.6133$ | | |
| $r_3 = 3.4956$ | $d_3 = 0.6906$ | $n_2 = 1.78590$ | $v_2 = 44.18$ |
| $r_4 = -1.1967$ | $d_4 = 0.0663$ | | |
| $r_5 = \infty$ (stop) | $d_5 = 0.2210$ | $n_3 = 1.52287$ | $v_3 = 59.89$ |
| $r_6 = \infty$ | $d_6 = 0.0166$ | | |
| $r_7 = \infty$ | $d_7 = 0.6077$ | $n_4 = 1.52000$ | $v_4 = 74.00$ |
| $r_8 = \infty$ | $d_8 = 0.4807$ | | |
| $r_9 = 6.0669$ | $d_9 = 0.7238$ | $n_5 = 1.60311$ | $v_5 = 60.70$ |
| $r_{10} = -0.8470$ | $d_{10} = 0.1989$ | $n_6 = 1.84666$ | $v_6 = 23.78$ |
| $r_{11} = -2.2459$ | $d_{11} = 0.8729$ | | |
| $r_{12} = 2.7182$ | $d_{12} = 0.4530$ | $n_7 = 1.72916$ | $v_7 = 54.68$ |
| $r_{13} = \infty$ | $d_{13} = 0.8287$ | $n_8 = 1.54814$ | $v_8 = 45.78$ |
| $r_{14} = \infty$ | $d_{14} = 0.2210$ | $n_9 = 1.52287$ | $v_9 = 59.89$ |
| $r_{15} = \infty$ | | | |

$|f_1/f| = 0.622, |f_2/f| = 1.213, |r_b/r_a| = 0.3423,$
$|f_1| + |f_2|)/f = 1.875, |f_1|/|f_2| = 0.5458$
$f_R = 2.44, f_{R/I} = 2.68, r_F/(n \cdot D) = 1.6679$
$r_F/(n \cdot D) = 1.6679$ Embodiment 8
$f = 1, NA = 0.0104, IH = 0.8180$
$2\omega = 100°$

| | | | |
|---|---|---|---|
| $r_1 = \infty$ | $d_1 = 0.2231$ | $n_1 = 1.88300$ | $v_1 = 40.78$ |

-continued

| | | | |
|---|---|---|---|
| $r_2 = 0.4993$ | $d_2 = 0.4462$ | | |
| $r_3 = 4.0957$ | $d_3 = 0.6842$ | $n_2 = 1.77250$ | $v_2 = 49.66$ |
| $r_4 = -0.9440$ | $d_4 = 0.1983$ | | |
| $r_5 = \infty$ (stop) | $d_5 = 0.4958$ | | |
| $r_6 = \infty$ | $d_6 = 0.7437$ | $n_3 = 1.52000$ | $v_3 = 74.00$ |
| $r_7 = \infty$ | $d_7 = 0.3619$ | | |
| $r_8 = 2.4254$ | $d_8 = 0.6941$ | $n_4 = 1.58913$ | $v_4 = 60.97$ |
| $r_9 = -0.9856$ | $d_9 = 0.1785$ | $n_5 = 1.84666$ | $v_5 = 23.78$ |
| $r_{10} = -5.4442$ | $d_{10} = 0.4264$ | | |
| $r_{11} = 2.4616$ | $d_{11} = 0.3966$ | $n_6 = 1.77250$ | $v_6 = 49.66$ |
| $r_{12} = \infty$ | $d_{12} = 0.9271$ | $n_7 = 1.54814$ | $v_7 = 45.78$ |
| $r_{13} = \infty$ | $d_{13} = 0.1983$ | $n_8 = 1.52287$ | $v_8 = 59.89$ |
| $r_{14} = \infty$ | | | |

$|f_1/f| = 0.566$, $|f_2/f| = 1.056$, $|r_b/r_a| = 0.2305$
$(|f_1| + |f_2|)/f = 1.622$, $|f_1|/|f_2| = 0.536$
$f_R/f = 2.448$, $f_{R/I} = 2.993$,
$r_F/(n \cdot D) = 1.4576$ Embodiment 9

$f = 1$, NA = 0.0118, IH = 0.9239
$2\omega = 120°$

| | | | |
|---|---|---|---|
| $r_1 = \infty$ | $d_1 = 0.2520$ | $n_1 = 1.88300$ | $v_1 = 40.78$ |
| $r_2 = 0.5638$ | $d_2 = 0.6719$ | | |
| $r_3 = 6.9994$ | $d_3 = 0.6887$ | $n_2 = 1.77250$ | $v_2 = 49.66$ |
| $r_4 = -1.0963$ | $d_4 = 0.0672$ | | |
| $r_5 = \infty$ (stop) | $d_5 = 0.5599$ | | |
| $r_6 = \infty$ | $d_6 = 0.8399$ | $n_3 = 1.52000$ | $v_3 = 74.00$ |
| $r_7 = \infty$ | $d_7 = 0.4087$ | | |
| $r_8 = 2.7391$ | $d_8 = 0.7839$ | $n_4 = 1.58913$ | $v_4 = 60.97$ |
| $r_9 = -1.1131$ | $d_9 = 0.2016$ | $n_5 = 1.84666$ | $v_5 = 23.78$ |
| $r_{10} = -6.1484$ | $d_{10} = 0.4815$ | | |
| $r_{11} = 2.7800$ | $d_{11} = 0.4479$ | $n_6 = 1.77250$ | $v_6 = 49.66$ |
| $r_{12} = \infty$ | $d_{12} = 1.047$ | $n_7 = 1.54814$ | $v_7 = 45.78$ |
| $r_{13} = \infty$ | $d_{13} = 0.2240$ | $n_8 = 1.52287$ | $v_8 = 59.89$ |
| $r_{14} = \infty$ | | | |

$|f_1/f| = 0.639$, $|f_2/f| = 1.274$, $|r_b/r_a| = 0.1566$
$(|f_1/f| + |f_2|)/f = 1.913$, $|f_1/f_2| = 0.5016$
$f_R/f = 2.764$, $f_{R/I} = 2.992$, $r_F = 2.78$,
$r_F/(n \cdot D) = 1.4574$ Embodiment 10

$f = 1$, NA = 0.0260, IH = 0.9786
$2\omega = 120°$

| | | | |
|---|---|---|---|
| $r_1 = \infty$ | $d_1 = 0.2669$ | $n_1 = 1.88300$ | $v_1 = 40.78$ |
| $r_2 = 0.8180$ | $d_2 = 0.7056$ | | |
| $r_3 = 5.2806$ | $d_3 = 0.8024$ | $n_2 = 1.88300$ | $v_2 = 40.78$ |
| $r_4 = -1.6378$ | $d_4 = 0.0528$ | | |
| $r_5 = \infty$ (stop) | $d_5 = 0.2372$ | $n_3 = 1.52287$ | $v_3 = 59.89$ |
| $r_6 = \infty$ | $d_6 = 0.0178$ | | |
| $r_7 = \infty$ | $d_7 = 0.6524$ | $n_4 = 1.52000$ | $v_4 = 74.00$ |
| $r_8 = \infty$ | $d_7 = 0.5484$ | | |
| $r_9 = 9.7750$ | $d_9 = 0.8685$ | $n_5 = 1.69680$ | $v_5 = 56.49$ |
| $r_{10} = -1.3219$ | $d_{10} = 0.2076$ | $n_6 = 1.84666$ | $v_6 = 23.78$ |
| $r_{11} = -19.8012$ | $d_{11} = 0.6378$ | | |
| (aspherical surface) | | | |
| $r_{12} = 3.0054$ | $d_{12} = 0.4864$ | $n_7 = 1.72916$ | $v_7 = 54.68$ |
| $r_{13} = \infty$ | $d_{13} = 0.8897$ | $n_8 = 1.54814$ | $v_8 = 45.78$ |
| $r_{14} = \infty$ | $d_{14} = 0.2372$ | $n_9 = 1.52287$ | $v_9 = 59.89$ |
| $r_{15} = \infty$ | | | |

Aspherical surface coefficients
$P = 1.0000$, $B = -0.17489$
$E = 0.24533 \times 10^{-1}$, $F = 0.14619 \times 10^{-1}$
$G = -0.58959 \times 10^{-2}$
$|f_1/f| = 0.926$, $|f_2/f| = 1.497$,
$|r_b/r_a| = 0.3102$
$(|f_1| + |f_2|)/f = 2.427$, $|f_1|/|f_2| = 0.619$
$f_R/f = 2.084$, $f_{R/I} = 2.129$,
$r_F/(n \cdot D) = 1.72$, $|h_A/I| = 0.7623$ wherein the reference symbols $r_1$, $r_2$, ... represent the radii of curvature on the surfaces of the respective lens elements, the reference symbols $d_1$, $d_2$, ... designate the thicknesses of the respective lens elements and the airspaces reserved therebetween, the reference symbols $n_1$, $n_2$, ... denote the refractive indices of the respective lens elements, and the reference symbols $v_1$, $v_2$, ... represent the Abbe's numbers of the respective lens elements.

Figure 9:
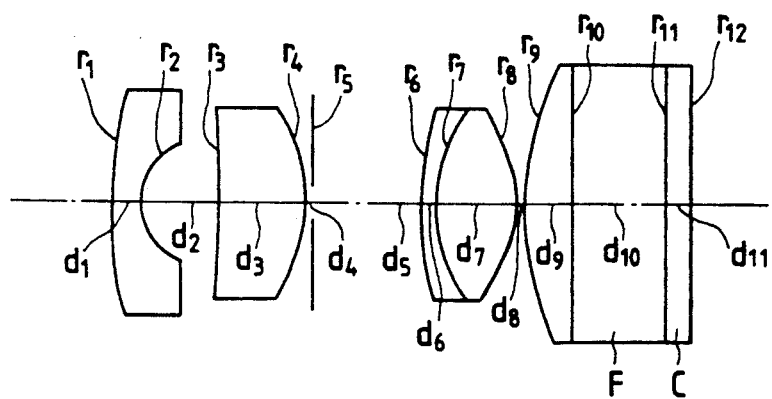
FIG. 9 through FIG. 18 show sectional views illustrating compositions of Embodiments 1 through 10 respectively of the objective lens system for endoscopes according to the present invention.

The Embodiment 1 is designed as an objective lens system which has the composition illustrated in FIG. 9, has a field angle of 120° and is combined with a solid-state image pickup device. In FIG. 9, the reference symbol F represents an optical low pass filter for eliminating moire and the reference symbol C designates a cover glass for the solid-state image pickup device. Further, a YAG filter and an infrared cut filter for cutting off laser light and infrared light are to be interposed between the aperture stop and the third lens component.

Figure 10:
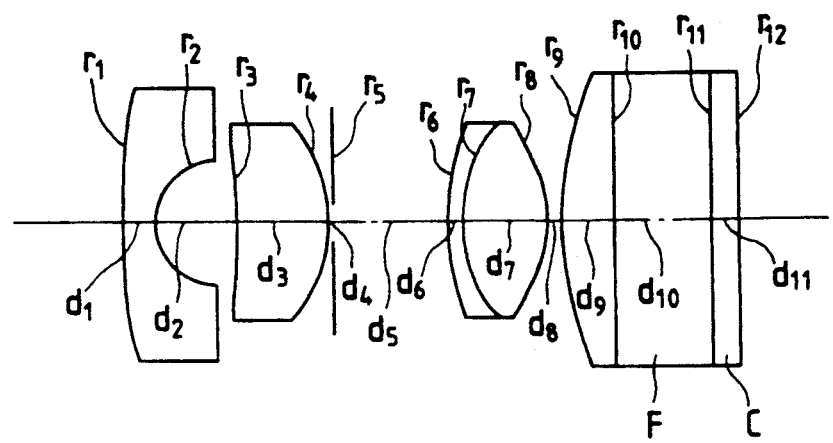

The Embodiment 2 is a lens system having the composition shown in FIG. 10, combined with a solid-state image pickup device like the Embodiment 1 and designed for a field angle of 140°.

In each of the Embodiments 1 and 2, aspherical surfaces are used as the first surface and the eighth surface. Speaking concretely, the aspherical surface is used as the first surface on which rays are highest in the section before the aperture stop for correcting a large amount of distortion. In the section after the aperture stop, the aspherical surface is used, for reducing coma, as the eighth surface which has a center of curvature on the side of the aperture stop and on which rays are high.

Figure 11:
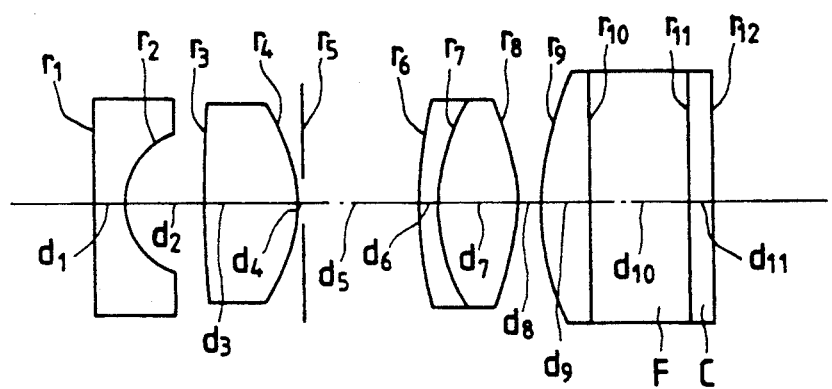
Figure 12:
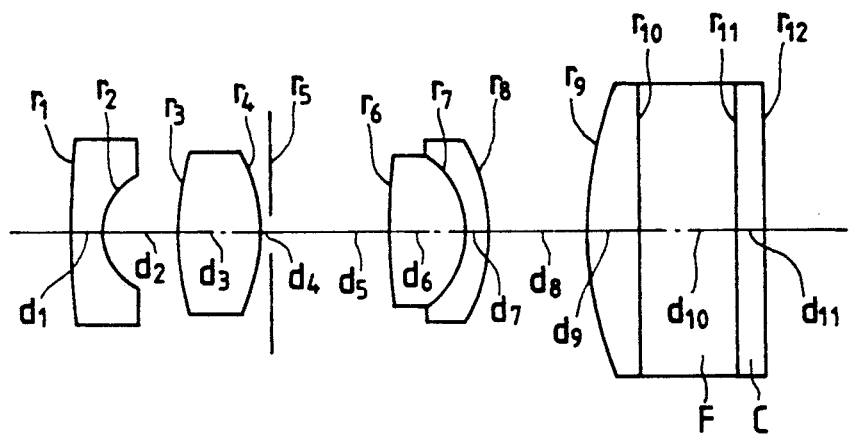

The Embodiments 3 and 4 have the compositions shown in FIG. 11 and FIG. 12 respectively, and are designed for a field angle of 120°. Further, each of the Embodiments 3 and 4 adopts only one aspherical surface. Speaking concretely, the Embodiment 3 uses the aspherical surface as the eighth surface, whereas the Embodiment 4 adopts the aspherical surface as the first surface.

Figure 29:
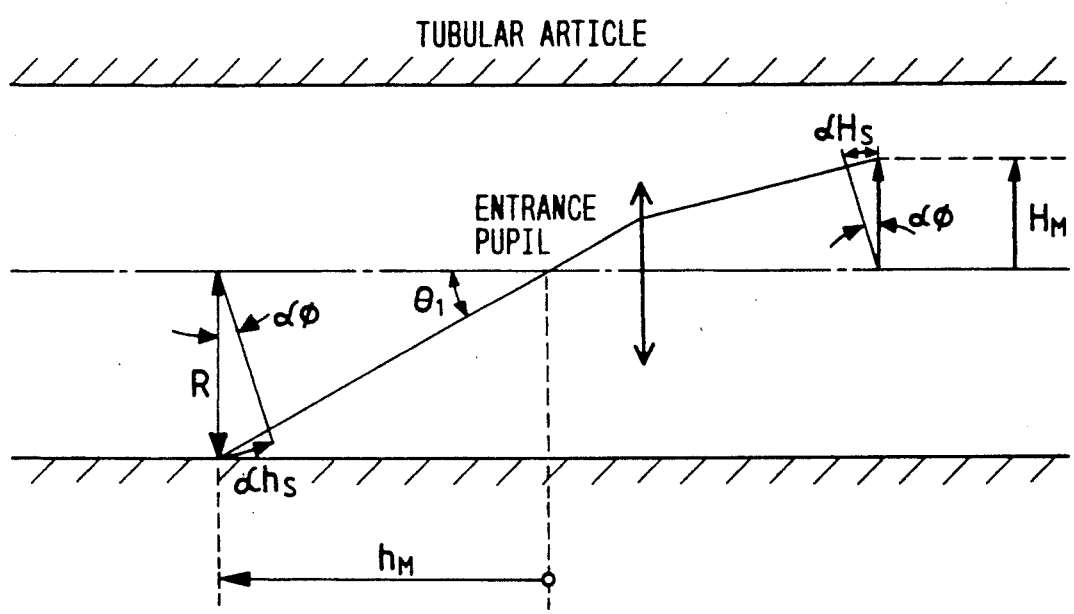
FIG. 29 shows a diagram for determining meridional magnification and sagittal magnification for observing interior of a tube through the objective lens system for endoscopes according to the present invention.

The Embodiments 3 and 4 have the common field angle of 120° and allow distortion to remain at low percentages of 29% and 33% respectively for the reason described below:

Endoscopes may be used, in the medical field, for observing interiors of tubular organs such as bronchus and intestinum crassum with the optical axes of the endoscopes aligned with the axes of the tubular organs or, in the industrial field, for observing interiors of gas pipes, water pipes and so on. FIG. 29 shows the conceptional view for observing interiors of a tubular article. It is desirable for observing the interiors of such a tubular article that images of the locations on the inside surface of the tubular article are not deformed at the marginal portions of the visual field. In order to prevent the images from being deformed, it is sufficient that the meridional magnification is equal to the sagittal magnification at the marginal portions of the visual field when the objective lens system is positioned so that the direction on the inside surface of the tubular article parallel with the axis of the tubular article is set as the meridional direction and the direction on the inside surface perpendicular to the axis of the tubular article is set as the sagittal direction.

FIG. 29 permits determining meridional magnification $\beta_M(\theta_1)$ and sagittal magnification $\beta_S(\theta_1)$ for observing interiors of a tubular article. For an objective lens system which has the characteristic of $A(\theta_1)$, $\beta_M(\theta_1)$ and $\beta_S(\theta_1)$ are given by the following formulae:

$$\beta_M(\theta_1) = -\frac{f}{R} \sin \cdot \theta_1 \cdot \frac{dA(\theta_1)}{d\theta_1}$$

$$\beta_S(\theta_1) = \frac{f}{R} \cdot A(\theta_1)$$

A combination of $\theta_1$ and K which gives $\beta_M(\theta_1)/\beta_s(\theta_1)=1$ when $A(\theta_1)=K \tan(\theta_1/K)$ satisfies the formula shown below:

$$2\sin^{2\theta}{}_1/k \sin(2\theta_1/K)=1$$

Relationship between $\theta_1$ and K is summarized as listed in the following table:

TABLE

| $\theta_1$ | 50° | 60° | 70° | 80° |
|---|---|---|---|---|
| K | 1.18 | 1.58 | 1.81 | 1.96 |

The relationship described above clarifies that an optical system having a field angle of 120° can be adapted for observation of interiors of tubular articles by controlling distortion to 32% or so. For this reason, the Embodiments 3 and 4 are designed so as to allow distortion to remain on the order of 30%. Only one aspherical surface is sufficient for correcting distortion at such a low degree.

As is exemplified by the Embodiments 3 and 4, the objective lens system for endoscopes according to the present invention can be adapted for observation of interiors of tubular articles by using only one aspherical surface. For this purpose, it is desirable to use the aspherical surface as the first surface when the objective lens system is to comprise the aspherical surface at a location before the aperture stop as in the case of the Embodiment 1 or 2, or as the eighth surface when the objective lens system is to comprise the aspherical surface at a location after the aperture stop.

Further, the departures $|\Delta x|$ from the reference spheres of the aspherical surface which are used in the Embodiments of the present invention as well as those of the aspherical surface adopted for the Embodiment 1 of the above-mentioned conventional example disclosed by Japanese Patent Kokai Publication No. Sho 60-169818 and the Embodiment 8 of the conventional example proposed by Japanese Patent Kokai Publication No. Sho 61-162021 are listed below:

Present invention:
  Embodiment 1
    0.09291 (1st surface)
    0.3453 [8th surface]
  Embodiment 2
    0.07179 (1st surface)
  Embodiment 3
    0.17798 (8th surface)
  Embodiment 4
    0.01017 (1st surface)
Japanese Patent Kokai Publication No. Sho 60-169818:
  Embodiment 1
    0.386 (3rd surface)
Japanese Patent Kokai Publication No. Sho 61-162021:
  Embodiment 8
    0.4062 (1st surface)
    0.1429 (13th surface)

As is clear from the values listed above, the $|\Delta x|$ adopted for the objective lens system for endoscopes according to the present invention has values smaller than that selected for the Embodiment 1 of Japanese Patent Kokai Publication No. Sho 60-169818 which has a field angle of 90° and distortion of approximately −5%. Further, the Embodiment 8 of Japanese Patent Kokai Publication No. Sho 61-162021 has a field angle of 120° and distortion of approximately 40% which are nearly equal to those of the Embodiments of the present invention, but adopts, for the aspherical surfaces used as the first surface and the thirteenth surface, values of $|\Delta x|$ which are larger than those of $|\Delta x|$ selected for the Embodiments of the present invention.

Figure 13:
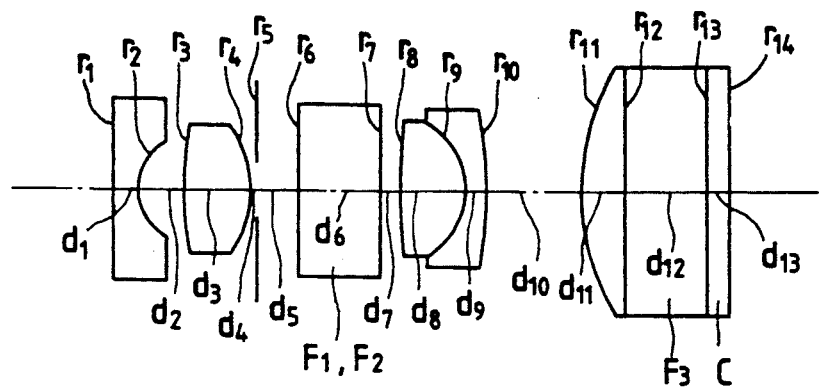

The Embodiment 5 of the present invention is an objective lens system which has the composition illustrated in FIG. 13, is designed as an example of the objective lens system for endoscopes according to the present invention combined with a solid-state image pickup device and has a field angle of 80°. In FIG. 13, the reference symbols $F_1$ and $F_2$ represent collectively a YAG filter and an infrared cut filter which are used for cutting off and absorbing the laser light and infrared light unwanted for observation.

Further, the reference symbol $F_3$ designates a quartz filter for eliminating moiré and the reference symbol C denotes a cover glass for the solid-state image pickup device.

Figure 14:
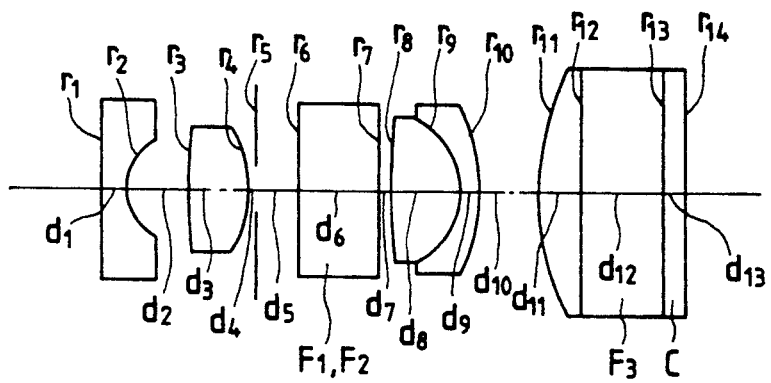
Figure 15:
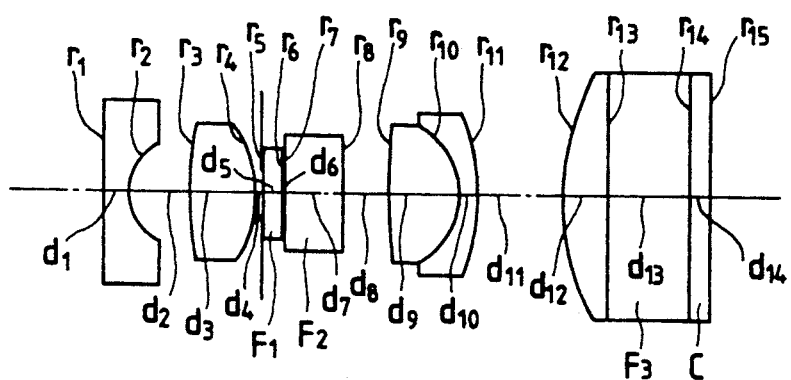

The Embodiments 6 and 7 have the compositions illustrated in FIG. 14 and FIG. 15 respectively, and are combined with solid-state image pickup devices like the Embodiment 5. The Embodiment 6 has a field angle of 140°, whereas the Embodiment 7 is designed for a field angle of 120°.

Figure 16:
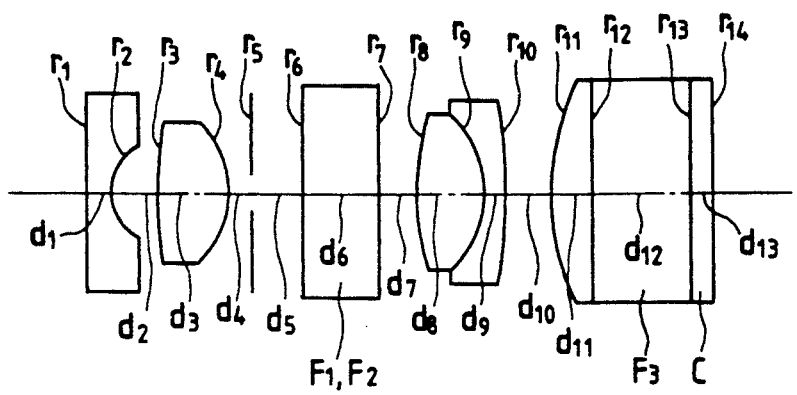
Figure 17:
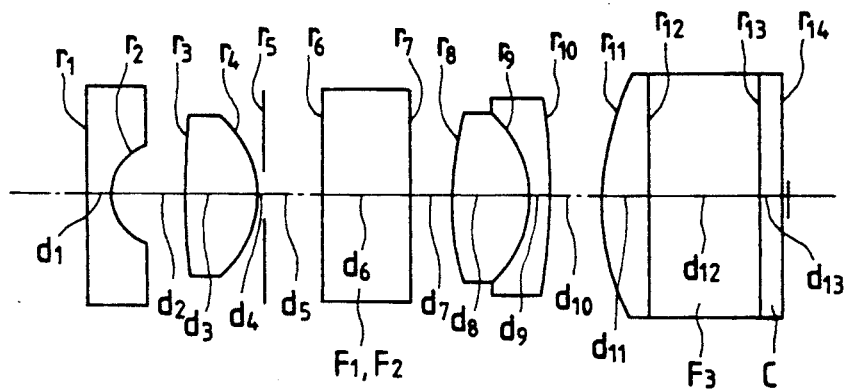

The Embodiments 8 and 9 have the compositions illustrated in FIG. 16 and FIG. 17 respectively, and are combined with solid-state image pickup devices like the Embodiment 5. These Embodiments 8 and 9 adopt a common rear lens unit which is arranged after the aperture stop. The Embodiment 8 has a field angle of 100°, whereas the Embodiment 9 is designed as an adapter type having a field angle of 120°.

Since aberrations are corrected nearly completely in each of the sections located before and after the aperture stop in the objective lens system for endoscopes according to the present invention, it can be designed as an adapter type as exemplified by the Embodiments 8 and 9.

Figure 18:
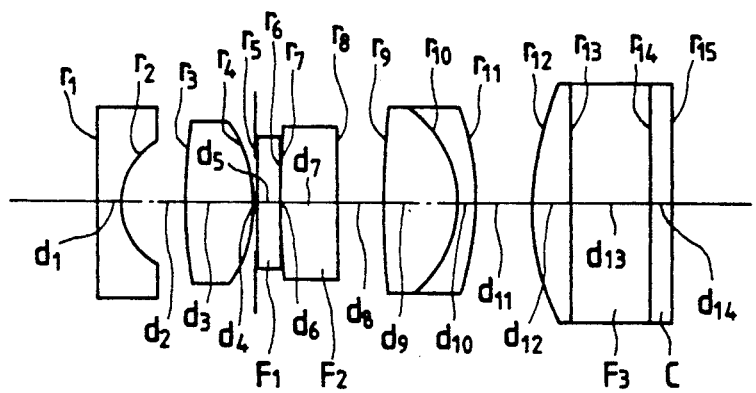
Figure 19:
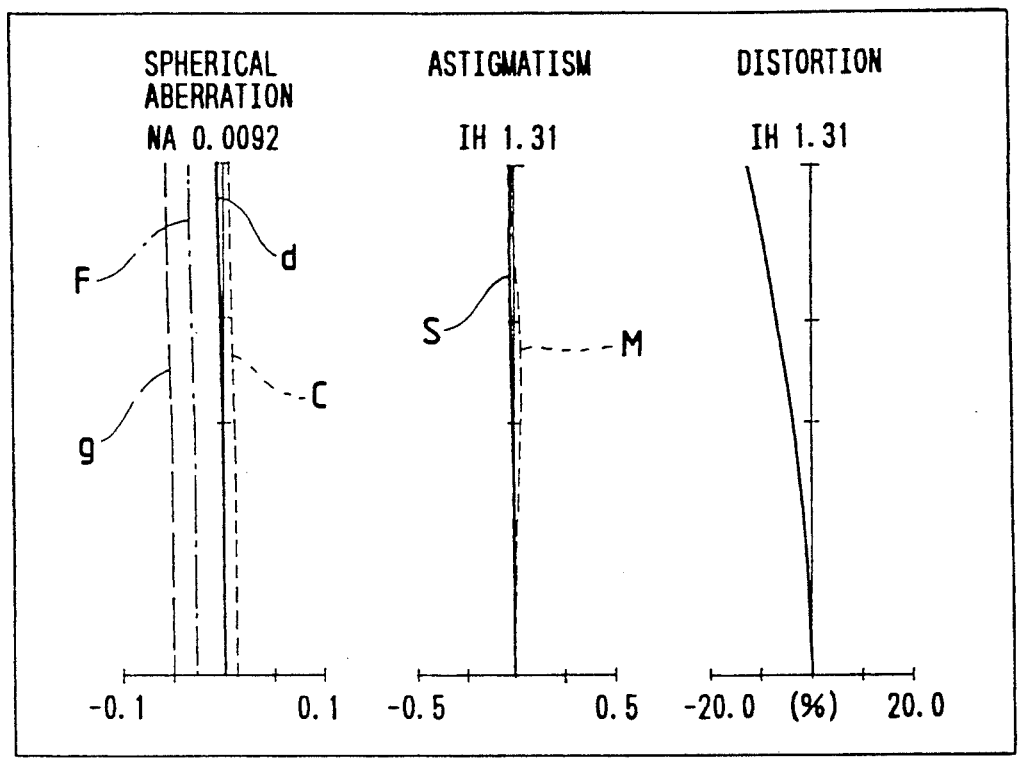
FIG. 19 through FIG. 28 show curves illustrating aberration characteristics of the Embodiments 1 through 10 respectively of the present invention.
Figure 20:
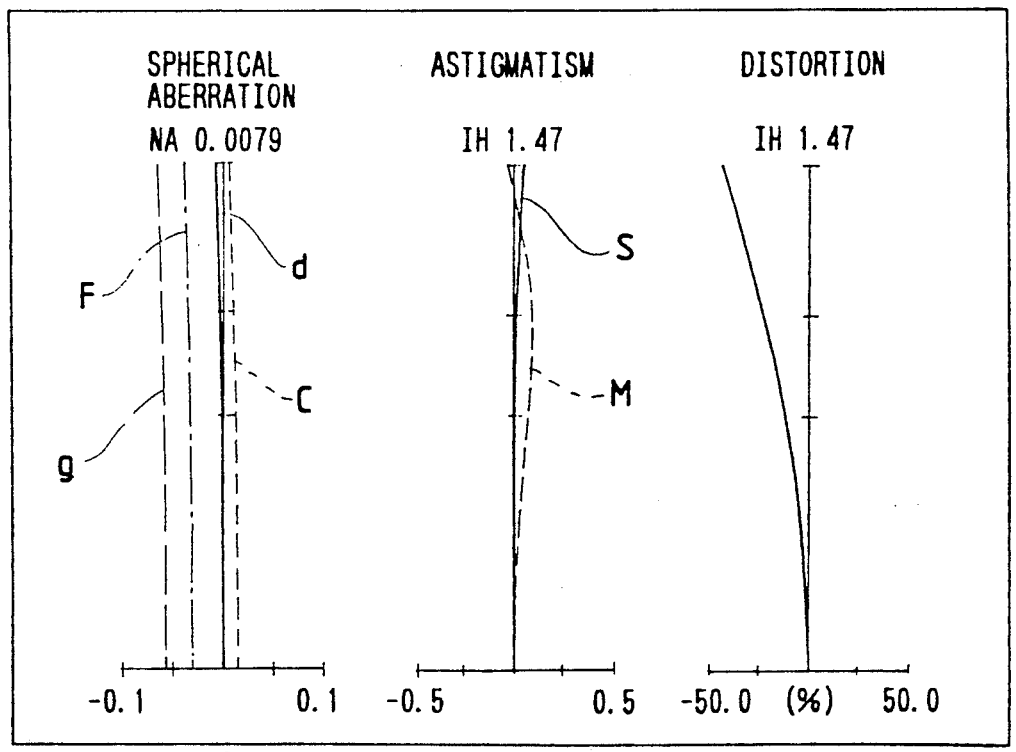
Figure 21:
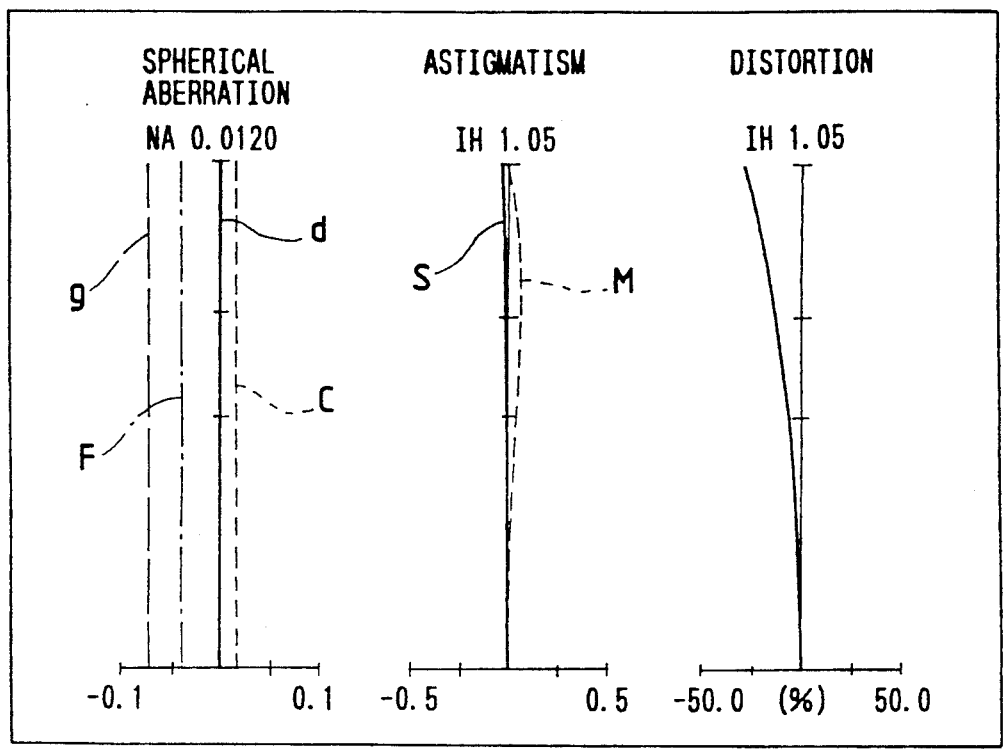
Figure 22:
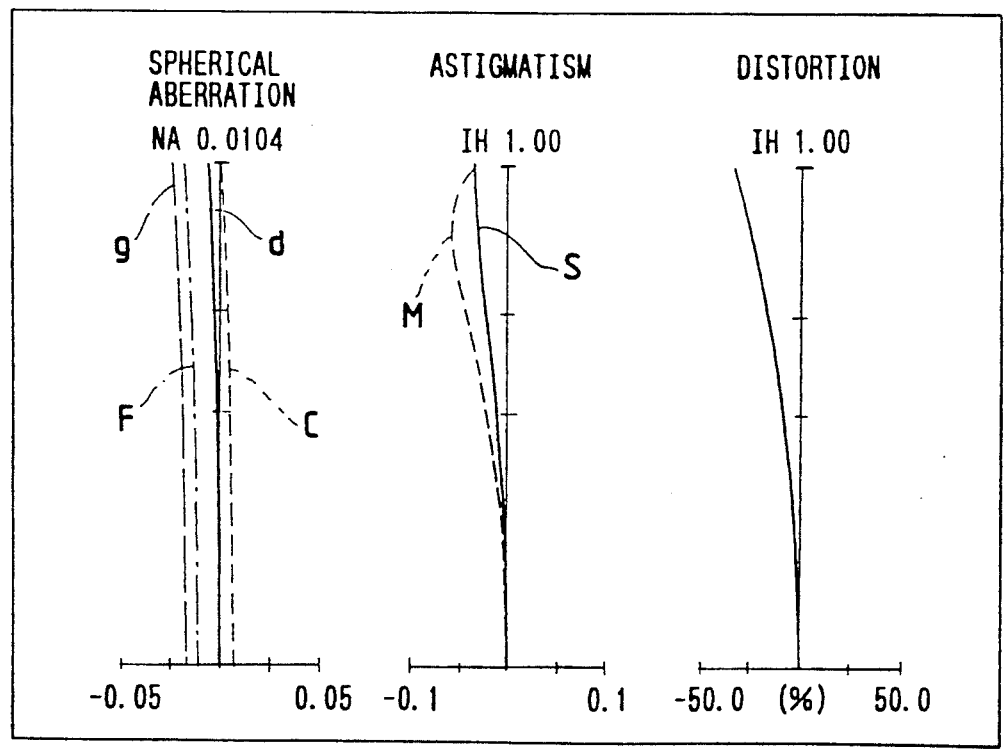
Figure 23:
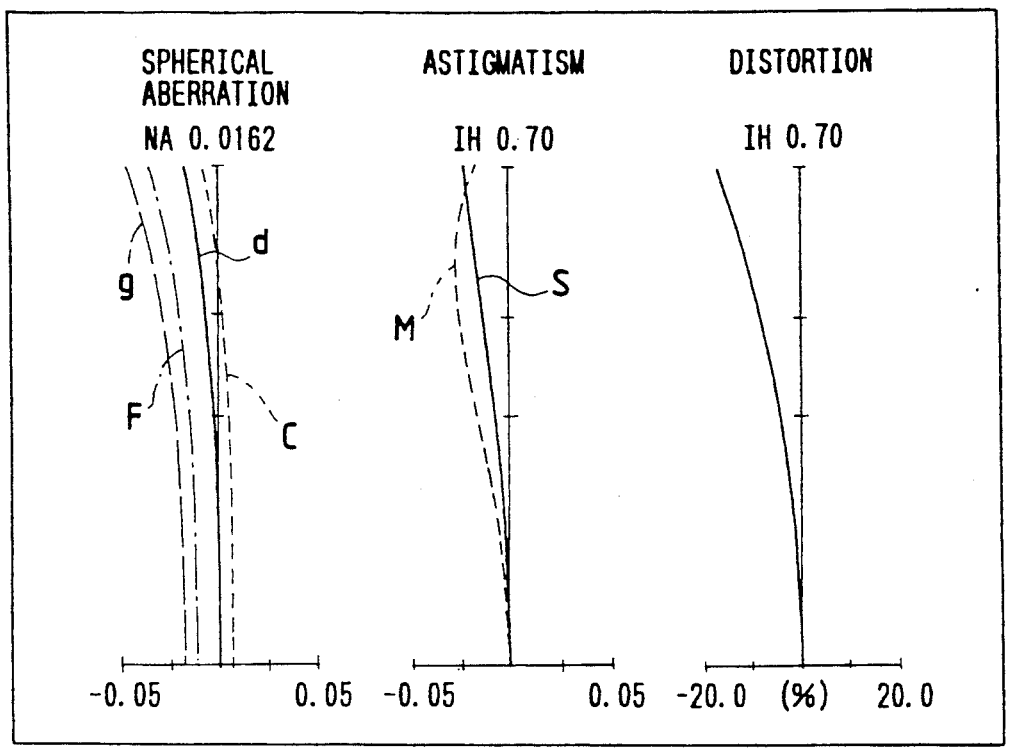
Figure 24:
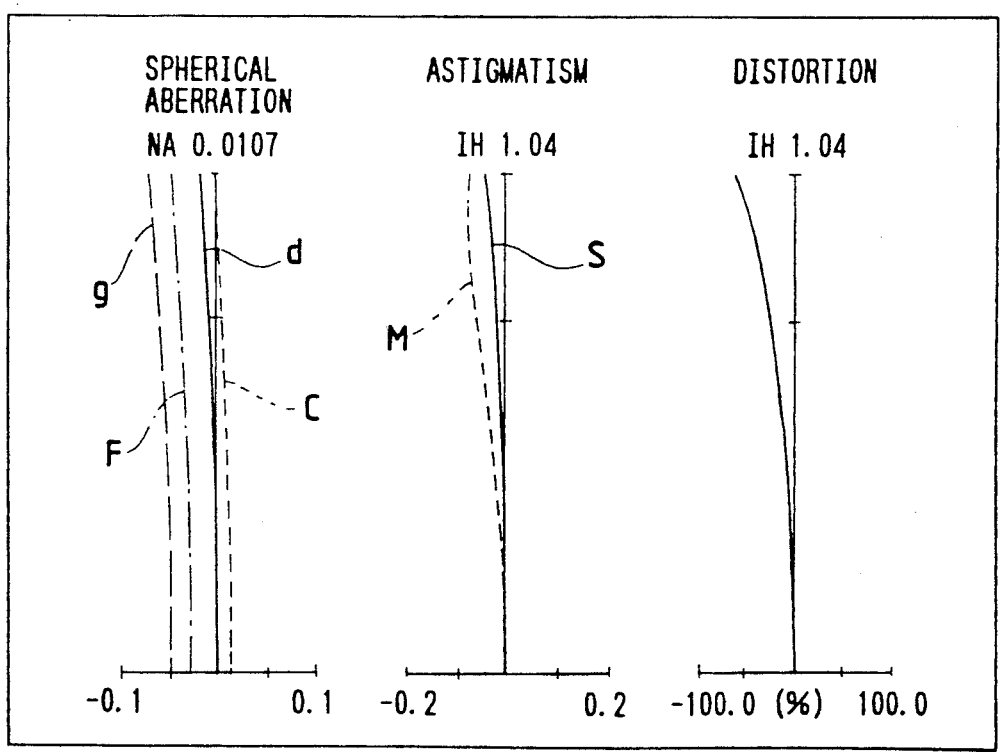
Figure 25:
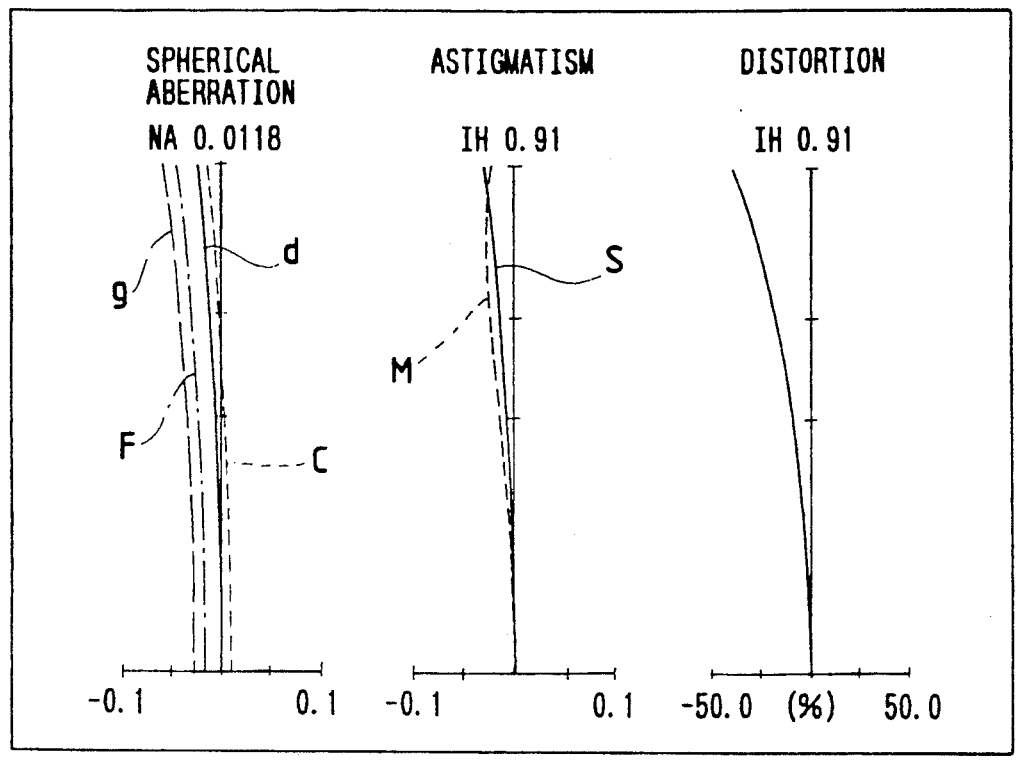
Figure 26:
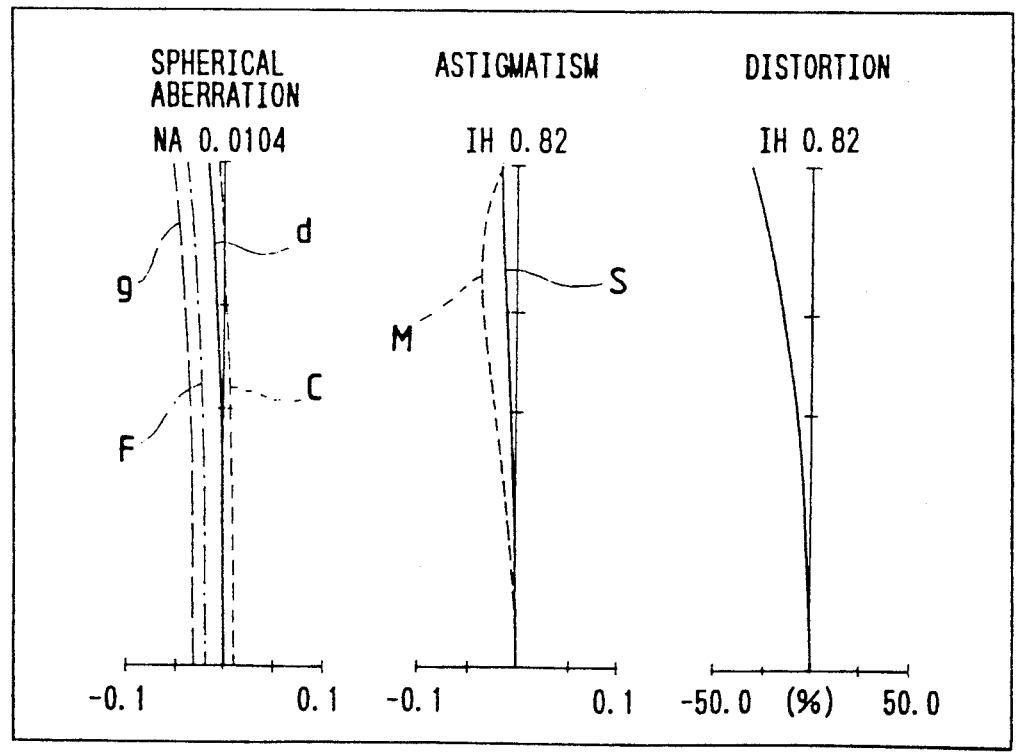
Figure 27:
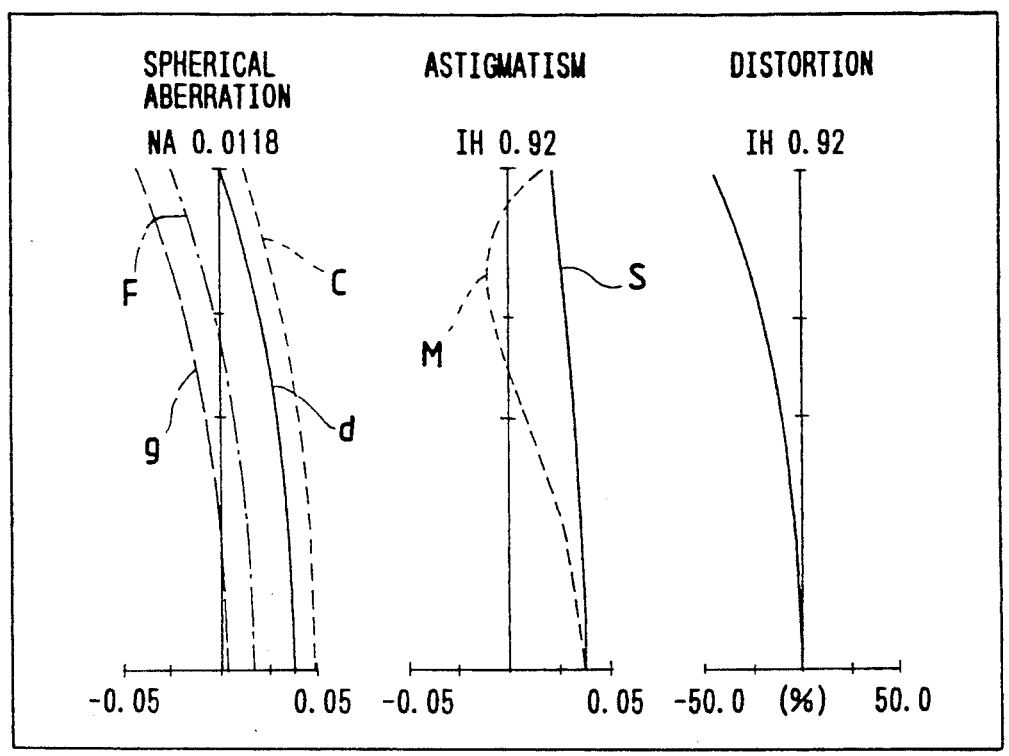
Figure 28:
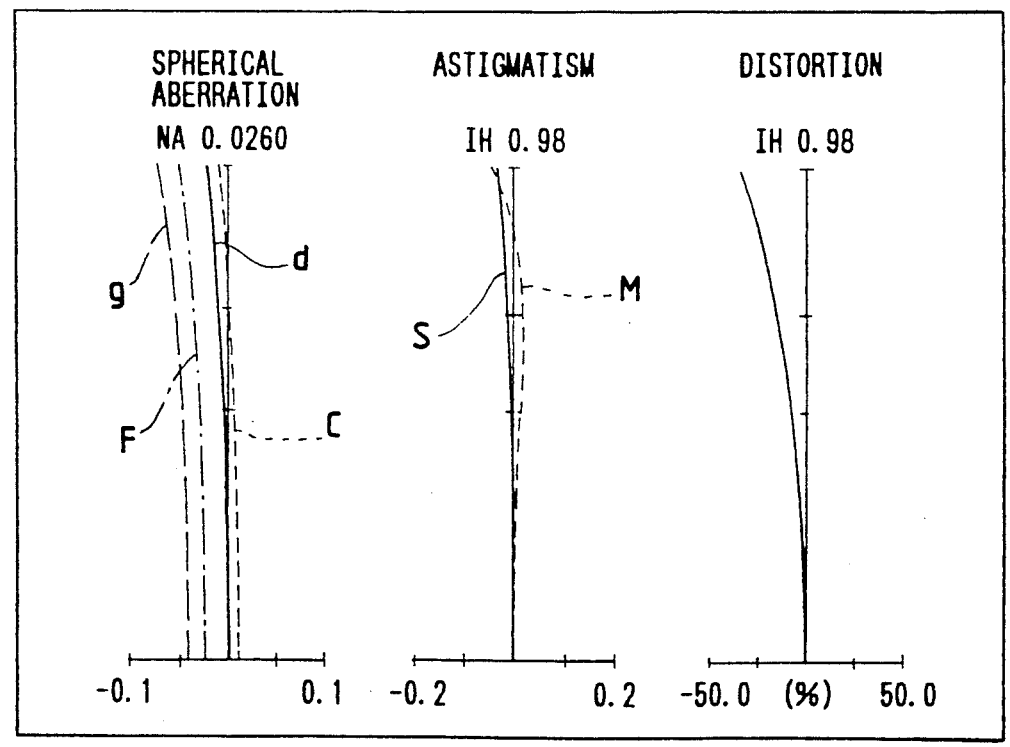

The Embodiment 10 has the composition illustrated in FIG. 18 wherein the objective lens system comprises a negative lens unit, an aperture stop and a positive lens unit, and uses as the eleventh surface an aspherical surface having refractive power which is weakened as the surface portions are farther from the optical axis. When the aspherical surface is used as the eleventh surface, it serves for correcting the remarkable coma and spherical aberration, with the other aberrations kept corrected favorably, which are produced by the first lens component arranged in an objective lens system having a large NA and cannot be corrected sufficiently by the second lens component.

Figure 5:
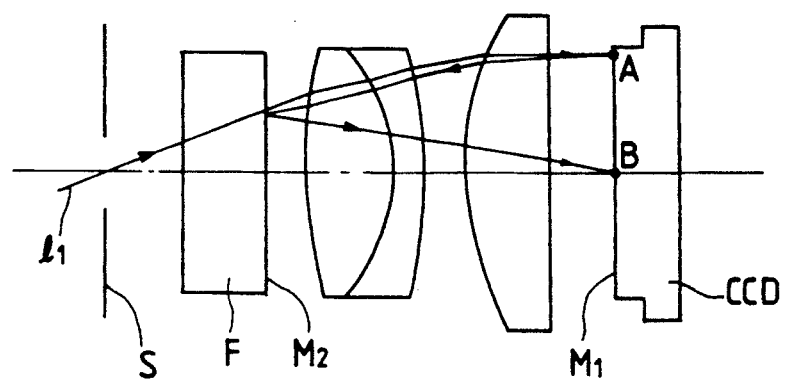
FIG. 5 shows a conceptional view illustrating the travelling course of the ray reflected on the surface of a filter when it is arranged in a telecentric optical system.
Figure 6:
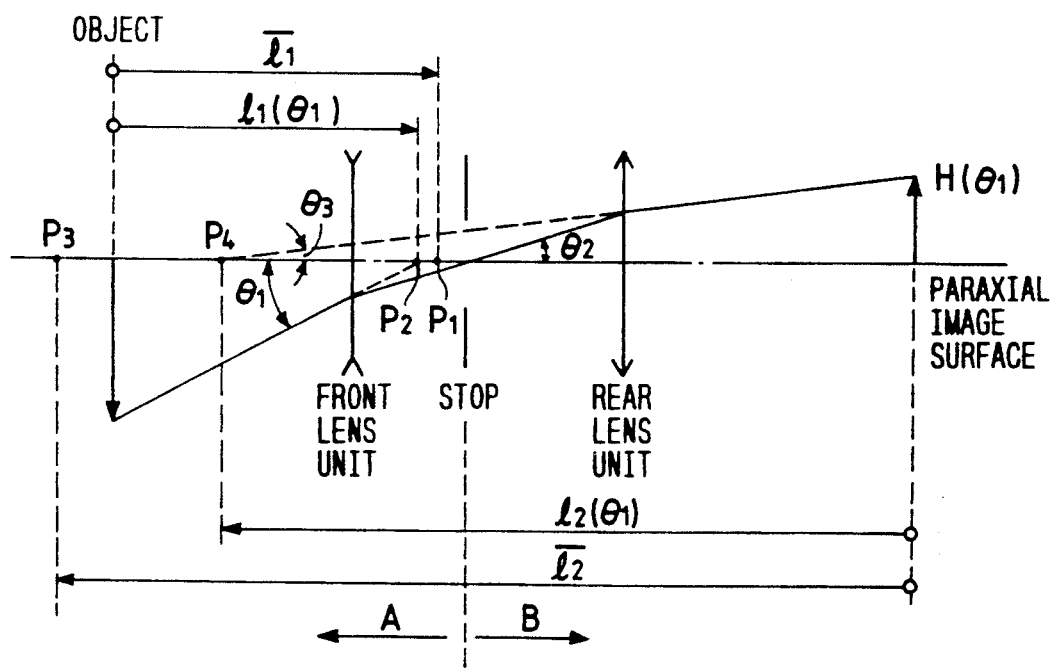
FIG. 6 shows a diagram illustrating a means for correcting distortion in the objective lens system for endoscopes according to the present invention.
Figure 7:
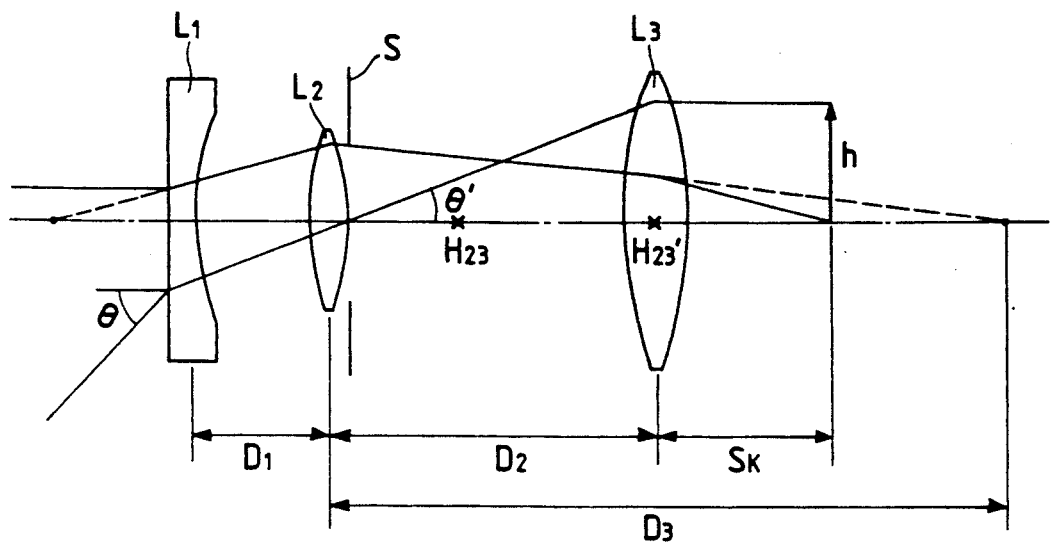
FIG. 7 shows a sectional view illustrating the composition of the objective lens system for endoscopes according to the present invention on an assumption that the lens system consists only of thin lens elements.
Figure 8:
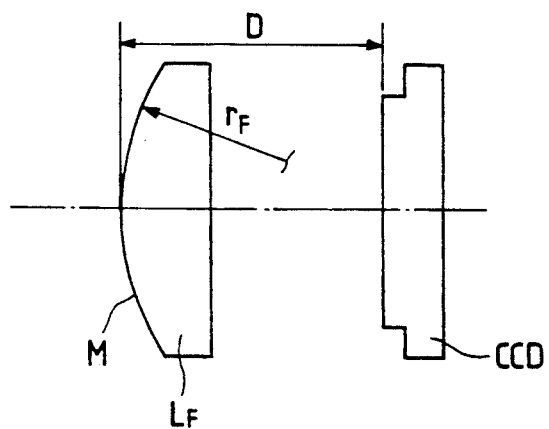
FIG. 8 shows a diagram illustrating relationship between the field lens to be used in the objective lens system for endoscopes according to the present invention and an light receiving surface of a image pickup device.

When an optical system combined with an image pickup device in which reflectance is high on the light receiving surface thereof is designed as a telecentric optical system, the ray having been reflected by the light receiving surface M may travel along the optical path in the reverse direction as illustrated in FIG. 5, thereby being reflected again on a surface of a built-in filter F, for example the surface $M_2$ falling again on the image pickup device and producing flare. When the offaxial ray $l_1$ shown in FIG. 5 travels along the optical path as described above and falls again on the surface $M_1$ at a point B located in the vicinity of the optical axis, and if the entire circumference of the marginal portions of the visual field is very bright as in the case of observation of interiors of a tubular article, all the offaxial rays represented by $l_1$ return to the point B on the optical axis, thereby producing flare at the center of the visual field. In order to prevent this flare, it is desirable to arrange a filter at the location right after the aperture stop in the objective lens system according to the present invention as illustrated in FIG. 5. Since the objective lens system according to the present invention permits locating the surface $M_2$ in the vicinity of the aperture stop, the point B corresponding to the location on which the rays producing flare fall is positioned at the location symmetrical with the point A corresponding to the image point so as to prevent production of the flare.

In addition, the shape of the aspherical surfaces used in the objective lens system for endoscopes according to the present invention is expressed by the following formula:

$$x = \frac{Cy^2}{1 + \sqrt{1 - pC^2y^2}} + By^2 + Ey^4 + Fy^6 + Gy^8 + \ldots$$

wherein the direction of the optical axis is taken as the x axis, the direction perpendicular to the optical axis is taken as the y axis, the reference symbol C represents the radius of curvature on the reference sphere of the aspherical surface of interest, the reference symbol p designates the conical coefficient, and the reference symbols B, E, F, G, ... denote the aspherical surface coefficients.

I claim:

1. An objective lens system for endoscopes comprising, in order from the object side:
   a first lens component having a negative refractive power;
   a second lens component having a positive refractive power;
   an aperture stop;
   a rear lens unit including a positive cemented lens component consisting of a positive lens element and a negative lens element, said rear lens unit having a positive refractive power as a whole;
   said aperture stop being disposed substantially at a location of a front focal point of said rear lens unit; and
   said objective lens system satisfying the following conditions (1), (2) and (3):
   (1) $|f_1/f| < 5$
   (2) $|f_2/f| < 10$
   (3) $|r_b/r_a| < 0.7$
   wherein the reference symbol f represents the focal length of the objective lens system as a whole, the reference symbols $f_1$ and $f_2$ designate the focal lengths of the first lens component and the second lens component, respectively, and the reference symbol $r_a$ represents a radius of curvature on the most object side surface of said second lens component and the reference symbol $r_b$ denotes a radius of curvature on the most image side surface of said second lens component.

2. An objective lens system for endoscopes according to claim 1 comprising an aspherical surface.

3. An objective lens system for endoscopes according to claim 1 wherein the second lens component is designed so as to satisfy the following condition (4):
   (4) $0.01 < |r_b/r_a| < 0.7$ 4. An objective lens system for endoscopes according to claim 2 satisfying the following condition (5):
   (5) $0.4 < |h_A/I| < 1.5$
   wherein the reference symbol $h_A$ represents the height of a ray on the aspherical surface, said ray being as large as the maximum image height, and the reference symbol I designates the maximum image height.

5. An objective lens system for endoscopes according to claim 2 wherein the aspherical surface is used in one of the lens components arranged on the object side of the aperture stop and said aspherical surface has such a shape as to strengthen positive refractive power as surface portions are farther from the optical axis or weaken negative refractive power as the surface portions are farther from the optical axis.

6. An objective lens system for endoscopes according to claim 2 wherein the aspherical surface is used in the rear lens unit arranged on the image side of the aperture stop and said aspherical surface has such a shape as to weaken positive refractive power as the surface portions are farther from the optical axis or strengthen negative refractive power as the surface portions are farther from the optical axis.

7. An objective lens system for endoscopes comprising, in order from the object side:
   a first lens component having a negative refractive power;
   a second lens component having a positive refractive power;
   an aperture stop; and
   a rear lens unit comprising a third lens component being a cemented doublet consisting of a positive lens element and a negative lens element, and a fourth lens component having a positive refractive power;
   wherein said rear lens unit has a positive refractive power as a whole;
   wherein said aperture stop is disposed substantially at a location of a front focal point of said rear lens unit; and
   wherein the first lens component and the second lens component satisfy the following conditions (5) and (6) respectively:
   (5) $0.5f < |f_1| + |f_2| < 5f$
   (6) $0.1 < |f_1|/|f_2| < 1.5$
   wherein the reference symbol f represents a focal length of said objective lens system as a whole, the reference symbol $f_1$ designates focal length of said first lens component and the reference symbol $f_2$ denotes focal length of said second lens component.

8. An objective lens system for endoscopes comprising, in order from the object side:
   a first lens component having a negative refractive power;
   a second lens component having a positive refractive power;
   an aperture stop; and
   a rear lens unit including a third lens component being a cemented doublet consisting of a positive lens element and a negative lens element, and a fourth lens component having a positive refractive power, said rear lens unit having a positive refractive power as a whole;
   said aperture stop being disposed substantially at a location of a front focal point of said rear lens unit;

wherein the rear lens unit satisfies the following condition (7):

(7) $1.5f < f_1 < 6f$ wherein the reference symbol $f_1$ represents the focal length of the rear lens unit, and the reference symbol f represents a focal length of said objective lens system as a whole.

9. An objective lens system for endoscopes comprising, in order from the object side:
   a first lens component having a negative refractive power;
   a second lens component having a positive refractive power;
   an aperture stop; and
   a rear lens unit including a third lens component being a cemented doublet consisting of a positive lens element and a negative lens element, and a fourth lens component having a positive refractive power, said rear lens unit having a positive refractive power as a whole;
   said aperture stop being disposed substantially at a location of a front focal point of said rear lens unit;
   wherein a plane parallel plate is disposed between the aperture stop and the rear lens unit, and said rear lens unit satisfies the following condition (8):

(8) $1.2 < f_R/I$ wherein the reference symbol $f_R$ represents the focal length of the rear lens unit and the reference symbol I designates the maximum image height.

10. An objective lens system for endoscopes comprising, in order from the object side:
    a first lens component having a negative refractive power;
    a second lens component having a positive refractive power;
    an aperture stop; and
    a rear lens unit comprising a third lens component being a cemented doublet consisting of a positive lens element and a negative lens element, and a fourth plano-convex lens component having a planar surface on the image side;
    wherein said rear lens unit has a positive refractive power as a whole;
    wherein said aperture stop is disposed substantially at a location of a front focal point of said rear lens unit; and
    wherein said fourth lens component satisfies the following condition (10):

(10) $1.1 \times nD < r, < 1.9 \times nD$ or $r, < 0.9 \times nD$ and $r, > 2.1 \times nD$ wherein the reference symbol r, represents the radius of curvature on the image side surface of the fourth lens components, the reference symbol n designates the refractive index of the medium located on the image side of said surface and the reference symbol D denotes the optical path length as measured from said surface to the image surface.

11. An objective lens system for endoscopes comprising, in order from the object side:
    a first lens component having a negative refractive power;
    a second lens component having a positive refractive power;
    an aperture stop; and
    a rear lens unit including a third lens component being a cemented doublet consisting of a positive lens element and a negative lens element, and a fourth lens component having a positive refractive power, said rear lens unit having a positive refractive power as a whole;
    said aperture stop being disposed substantially at a location of a front focal point of said rear lens unit;
    said objective lens system satisfying the following conditions (1), (2) and (3):

(1) $|f_1/f| < 5$
(2) $|f_2/f| < 10$
(3) $|r_b/r_a| < 0.7$ wherein the reference symbol f represents the focal length of the objective lens system as a whole, the reference symbols $f_1$ and $f_2$ designate the focal lengths of the first lens component and the second lens component, respectively, and the reference symbol $r_a$ represents a radius of curvature on the most object side surface of said second lens component and the reference symbol $r_b$ denotes a radius of curvature on the most image side surface of said second lens component.

12. An objective lens system for endoscopes according to claim 1 satisfying the following condition (4):

(4) $0.01 < |r_b/r_a < 0.7$.

13. An objective lens system for endoscopes according to claim 12 satisfying the following condition (10):

(10) $1.2 < f_R/I$.

* * * * *